United States Patent
Zhang et al.

(10) Patent No.: US 11,165,864 B2
(45) Date of Patent: Nov. 2, 2021

(54) INFORMATION SYNCHRONIZATION METHOD AND APPARATUS

(71) Applicant: Huawei Technologies Co., Ltd., Shenzhen (CN)

(72) Inventors: Heng Zhang, Hangzhou (CN); Chao Zhou, Hangzhou (CN); Xuming Yao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/136,270

(22) Filed: Dec. 29, 2020

(65) Prior Publication Data

US 2021/0120085 A1    Apr. 22, 2021

Related U.S. Application Data

(63) Continuation of application No. PCT/CN2020/076858, filed on Feb. 26, 2020.

(30) Foreign Application Priority Data

May 21, 2019 (CN) .......................... 201910425422.6

(51) Int. Cl.
*H04L 29/08* (2006.01)
*G06F 16/27* (2019.01)

(52) U.S. Cl.
CPC .......... *H04L 67/1095* (2013.01); *G06F 16/27* (2019.01); *H04L 67/1097* (2013.01)

(58) Field of Classification Search
CPC ...................................................... G06F 16/27

USPC ........................................................ 709/217
See application file for complete search history.

(56) References Cited

U.S. PATENT DOCUMENTS

| | | | |
|---|---|---|---|
| 2007/0110063 A1 | 5/2007 | Tang et al. | |
| 2010/0100590 A1* | 4/2010 | Palay | G06Q 10/107 709/203 |
| 2012/0209808 A1 | 8/2012 | Tien et al. | |
| 2013/0054522 A1* | 2/2013 | Gao | G06F 16/27 707/620 |

(Continued)

FOREIGN PATENT DOCUMENTS

| | | |
|---|---|---|
| CN | 102404387 A | 4/2012 |
| CN | 103577382 A | 2/2014 |

(Continued)

*Primary Examiner* — Wing F Chan
*Assistant Examiner* — Leon Y Tseng
(74) *Attorney, Agent, or Firm* — Conley Rose, P.C.

(57) ABSTRACT

An information synchronization method includes determining, by a first node with an information synchronization capability based on a first node information list and a second node information list, a second node on which an information synchronization is not performed and that is in a node group to which the first node belongs, where the first node information list includes first node information of third nodes in the node group, and the second node information list includes second node information of a fourth node that is in the node group and on which information synchronization has been performed, selecting, by the first node, the second node, performing the information synchronization on the second node, and adding third node information corresponding to the second node to the second node information list.

20 Claims, 11 Drawing Sheets

(56) References Cited

U.S. PATENT DOCUMENTS

2018/0024701 A1* 1/2018 Sanches ............... G06F 40/166
                                                715/781
2018/0341691 A1   11/2018 Ekbom

FOREIGN PATENT DOCUMENTS

| CN | 103648083 A | 3/2014 |
| CN | 105740248 A | 7/2016 |
| CN | 108984662 A | 12/2018 |
| CN | 109274754 A | 1/2019 |

* cited by examiner

Second-round information synchronization: Current nodes on which information synchronization has been performed are [1, 2, 13]

Fourth-round information synchronization: Current nodes on which information synchronization has been performed in the distributed network are [1, 2, 3, 4, 5, 6, 7, 8, 9, 13, 14, 15, 16, 19, 20, 21, 22]

[2, 4, 8, 9, 10]     [3, 7, 8, 9, 10]     [2, 4, 8, 9, 10]

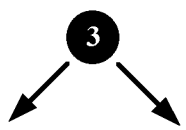 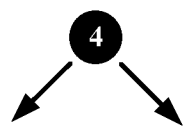 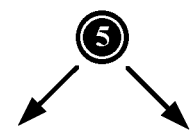

R 10    8 E      E 8    9 E      E 2    9 E

Remaining nodes on which information synchronization is not performed: [2, 4, 9]    Remaining nodes on which information synchronization is not performed: [3, 7, 10]    Remaining nodes on which information synchronization is not performed: [4, 8, 10]

[2, 3, 4, 7, 10]   [2, 4, 8, 9, 10]   [2, 3, 4, 7, 10]   [2, 3, 4, 7, 10]

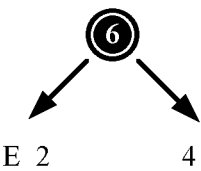 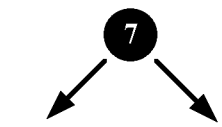 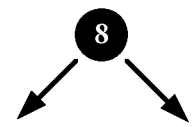 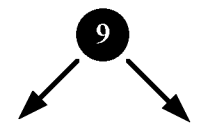

E 2   4 E    E 8   4 E    E 10   4 E    E 10   7 E

Remaining nodes on which information synchronization is not performed: [3, 7, 10]   Remaining nodes on which information synchronization is not performed: [2, 9, 10]   Remaining nodes on which information synchronization is not performed: [2, 3, 7]   Remaining nodes on which information synchronization is not performed: [2, 3, 4]

CONT.
FROM
FIG. 9A

[11, 12, 16, 17, 18, 20]

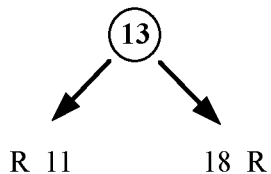

R 11     18 R

Remaining nodes on which
information synchronization is not
performed: [12, 16, 17, 20]

[11, 12, 16, 17, 18, 20]

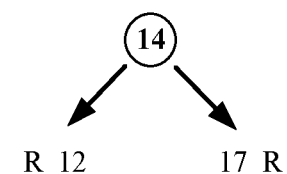

R 12     17 R

Remaining nodes on which
information synchronization is not
performed: [11, 16, 18, 20]

[11, 12, 14, 17, 18, 19]    [11, 12, 16, 17, 18, 20]    [11, 12, 14, 17, 18, 19]

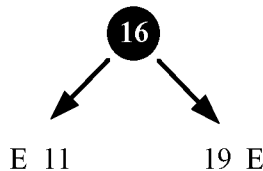     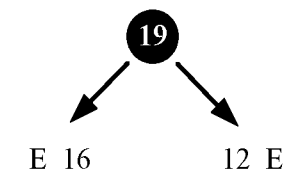     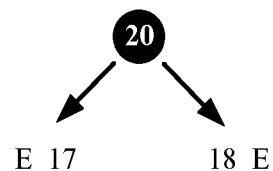

E 11    19 E     E 16    12 E     E 17    18 E

Remaining nodes on which information synchronization is not performed: [12, 14, 17, 18]    Remaining nodes on which information synchronization is not performed: [11, 17, 18, 20]    Remaining nodes on which information synchronization is not performed: [11, 12, 14, 19]

Note: ◉ Indicates a node that suspends, for a period of time during the third-round information synchronization, information synchronization before continuing to perform information synchronization and that stops information synchronization after the third-round information synchronization is completed ◯ Indicates a node that suspends, for a period of time during the third-round information synchronization, information synchronization before continuing to perform information synchronization ● Indicates a node that stops information synchronization after the third-round information synchronization is completed

FIG. 9B

INFORMATION SYNCHRONIZATION METHOD AND APPARATUS

CROSS-REFERENCE TO RELATED APPLICATION

This application is a continuation of International Patent Application No. PCT/CN2020/076858 filed on Feb. 26, 2020, which claims priority to Chinese Patent Application No. 201910425422.6 filed on May 21, 2019. The disclosures of the aforementioned applications are hereby incorporated by reference in their entireties.

TECHNICAL FIELD

This application relates to the field of blockchain technologies, and in particular, to an information synchronization method and apparatus.

BACKGROUND

A distributed network system includes a plurality of connected nodes. Generally, content needs to be synchronized between the plurality of nodes. In some other approaches, when content is synchronously updated between nodes, generally, a node that has obtained updated content needs to broadcast the updated content of the node to other nodes in a network. For example, a node that has obtained updated content randomly selects N adjacent nodes as target nodes, and sends a gossip message carrying the updated content. After receiving the gossip message, each of the N adjacent nodes updates data of the adjacent node based on the updated content, generates a response message, and sends the response message to the node that sends the gossip message. Then, each of the N adjacent nodes serves as a node that has obtained the updated content, randomly selects N adjacent nodes as target nodes, and sends a gossip message carrying the updated content. After the foregoing operations are performed for a plurality of times, content of each node in the entire network is synchronously updated.

The foregoing method for updating node content in the distributed network system has the following main problem. A node that has obtained updated content randomly selects a target node and sends a gossip message to the target node. In this way, it is likely that target nodes selected by different nodes are the same. As a result, one target node may receive gossip messages sent from different nodes, and updated content carried in the different gossip messages is the same. This may cause a waste of resources in a content update process. Alternatively, some nodes are not selected as target nodes by any other node. As a result, these nodes cannot receive gossip messages all the time, and cannot update content. This may cause incomplete synchronization.

SUMMARY

This application provides an information synchronization method and apparatus, to avoid a problem that synchronization is incomplete and resources are wasted in a synchronization process when node content is updated in a distributed network system.

According to a first aspect, an embodiment of this application provides an information synchronization method, including determining, by a first node with an information synchronization capability based on a first node information list and a second node information list, a node on which information synchronization is not performed and that is in a node group to which the first node belongs, where the first node information list includes node information of all nodes in the node group, and the second node information list includes node information of a node that is in the node group and on which information synchronization has been performed, and selecting, by the first node, at least one second node from the node on which information synchronization is not performed, performing information synchronization on the at least one second node, and updating by adding node information respectively corresponding to the at least one second node to the second node information list.

Based on this solution, the first node selects, from the node on which information synchronization is not performed, a node for information synchronization. This speeds up information synchronization, reduces energy consumption, and improves performance of a blockchain platform.

In a possible implementation, the first node determines a node corresponding to node information that is included in the first node information list but is not included in the second node information list as the node on which information synchronization is not performed.

Based on this solution, a method for determining the node on which information synchronization is not performed is provided.

In a possible implementation, the node group includes all nodes in a network system, or the node group is a node group obtained after all nodes in a network system are grouped.

Based on this solution, a manner of grouping the nodes in the entire network system is provided for information synchronization. In this way, when a first node in the network system randomly selects a node on which information synchronization is not performed, to perform information synchronization, a first node in each group only needs to perform information synchronization on a node on which content update is not performed and that is in the group to which the first node belongs. Therefore, the first node does not need to determine a node on which content update is not performed and that is in the entire distributed network system. In this way, the first node only needs to consider a relatively small quantity of nodes on which content update is not performed, and first nodes in a plurality of groups simultaneously perform information synchronization on nodes on which information synchronization is not performed and that are in the groups to which the first nodes belong. This can implement concurrent information synchronization, and improve information synchronization efficiency.

In a possible implementation, a variance between a quantity of nodes included in each node group and an average node quantity is a minimum value, and the average node quantity is a quotient obtained by dividing a quantity of all the nodes in the network system by a preset quantity of node groups that need to be obtained through grouping.

Based on this solution, a method for grouping all the nodes in the network system when performing information synchronization is provided.

In a possible implementation, if N node groups are obtained after all the nodes in the network system are grouped, quantities of nodes in the $1^{st}$ to the $(N-1)^{th}$ node groups are equal, and a quantity of nodes in the $N^{th}$ node group is less than or equal to a quantity of nodes included in any one of the $1^{st}$ to the $(N-1)^{th}$ node groups.

Based on this solution, another method for grouping all the nodes in the network system when performing information synchronization is provided.

In a possible implementation, the method further includes stopping, by the first node, information synchronization when determining that the second node information list includes all node information included in the first node information list, or stopping, by the first node, information synchronization when receiving a response that indicates an information synchronization failure and that is fed back by any one second node.

Based on this solution, a method for determining to stop information synchronization is provided.

In a possible implementation, the method further includes if the selecting, by the first node, at least one second node from the node on which information synchronization is not performed is used as one round of selection operation, suspending an information synchronization operation when a quantity of rounds of continuously performing the selection operation by the first node reaches a first threshold, and resuming, by the first node, the information synchronization operation after preset suspension duration, where the preset duration is determined based on an accumulated quantity of rounds of performing the selection operation by the first node.

Based on this solution, a solution of suspending information synchronization by some first nodes in the entire distributed network system is provided. This reduces overall power consumption of the entire system, and avoids excessively high power consumption of a node in the system.

According to a second aspect, an embodiment of this application further provides an information synchronization method, including determining, by a first node with an information synchronization capability based on a first node information list and a second node information list that is maintained by the first node, a node on which information synchronization is not performed and that is in a node group to which the first node belongs, where the first node information list includes node information of all nodes in the node group, and the second node information list includes node information that is learned by the first node and that is of a node on which information synchronization has been performed, selecting, by the first node, at least one second node from the node on which information synchronization is not performed, performing information synchronization on the at least one second node, and updating by adding node information respectively corresponding to the at least one second node to the second node information list, and sending, by the first node, an updated second node information list to a second node for which information synchronization is successfully completed such that the second node for which information synchronization is successfully completed updates, based on the received second node information list, a second node information list corresponding to the second node for which information synchronization is successfully completed.

Based on this solution, the first node selects, from the node on which information synchronization is not performed, a node for information synchronization. This speeds up information synchronization, reduces energy consumption, and improves performance of a blockchain platform.

In a possible implementation, the first node determines a node corresponding to node information that is included in the first node information list but is not included in the second node information list as the node on which information synchronization is not performed.

Based on this solution, a method for determining the node on which information synchronization is not performed is provided.

In a possible implementation, the node group includes all nodes in a network system, or the node group is a node group obtained after all nodes in a network system are grouped.

Based on this solution, a manner of grouping the nodes in the entire network system is provided for information synchronization. In this way, when a first node in the network system randomly selects a node on which information synchronization is not performed, to perform information synchronization, a first node in each group only needs to perform information synchronization on a node on which content update is not performed and that is in the group to which the first node belongs. Therefore, the first node does not need to determine a node on which content update is not performed and that is in the entire distributed network system. In this way, the first node only needs to consider a relatively small quantity of nodes on which content update is not performed, and first nodes in a plurality of groups simultaneously perform information synchronization on nodes on which information synchronization is not performed and that are in the groups to which the first nodes belong. This can implement concurrent information synchronization, and improve information synchronization efficiency.

In a possible implementation, a variance between a quantity of nodes included in each node group and an average node quantity is a minimum value, and the average node quantity is a quotient obtained by dividing a quantity of all the nodes in the network system by a preset quantity of node groups that need to be obtained through grouping.

Based on this solution, a method for grouping all the nodes in the network system when performing information synchronization is provided.

In a possible implementation, if N node groups are obtained after all the nodes in the network system are grouped, quantities of nodes in the $1^{st}$ to the $(N-1)^{th}$ node groups are equal, and a quantity of nodes in the $N^{th}$ node group is less than or equal to a quantity of nodes included in any one of the $1^{st}$ to the $(N-1)^{th}$ node groups.

Based on this solution, another method for grouping all the nodes in the network system when performing information synchronization is provided.

In a possible implementation, the method further includes stopping, by the first node, information synchronization when determining that the second node information list includes all node information included in the first node information list, or stopping, by the first node, information synchronization when receiving a response that indicates an information synchronization failure and that is fed back by any one second node.

Based on this solution, a method for determining to stop information synchronization is provided.

In a possible implementation, the method further includes if the selecting, by the first node, at least one second node from the node on which information synchronization is not performed is used as one round of selection operation, suspending an information synchronization operation when a quantity of rounds of continuously performing the selection operation by the first node reaches a first threshold, and resuming, by the first node, the information synchronization operation after preset suspension duration, where the preset duration is determined based on an accumulated quantity of rounds of performing the selection operation by the first node.

Based on this solution, a solution of suspending information synchronization by some first nodes in the entire distributed network system is provided. This reduces overall power consumption of the entire system, and avoids excessively high power consumption of a node in the system.

According to a third aspect, an embodiment of this application provides an information synchronization apparatus. The apparatus may be configured to perform the operations in the first aspect and any possible implementation of the first aspect, for example, the apparatus may include modules and units configured to perform the operations in any one of the first aspect or the possible implementations of the first aspect, and/or the apparatus may be configured to perform the operations in the second aspect and any possible implementation of the second aspect, for example, the apparatus may include modules and units configured to perform the operations in any one of the second aspect or the possible implementations of the second aspect.

According to a fourth aspect, an embodiment of this application provides an information synchronization method. The apparatus includes a processor and a transceiver. Optionally, the apparatus may further include a memory. The processor, the transceiver, and the memory communicate with each other through an inner connection path. The memory is configured to store an instruction. The processor is configured to execute the instruction stored in the memory. When the processor executes the instruction stored in the memory, the apparatus is enabled to perform the method in any one of the first aspect or the possible implementations of the first aspect, and/or the apparatus is enabled to perform the method in any one of the second aspect or the possible implementations of the second aspect.

According to a fifth aspect, an embodiment of this application provides a chip system. The chip system includes a processor, and optionally, further includes a memory. The memory is configured to store a computer program. The processor is configured to invoke the computer program from the memory and run the computer program, to enable a communications device on which the chip system is installed, to perform the method in any one of the first aspect or the possible implementations of the first aspect, and/or to enable a communications device on which the chip system is installed, to perform the method in any one of the second aspect or the possible implementations of the second aspect.

According to a sixth aspect, an embodiment of this application provides a computer program product. The computer program product includes computer program code. When the computer program code is run by a communications unit, a processing unit, a transceiver, or a processor of a communications device, the communications device is enabled to perform the method in any one of the first aspect or the possible implementations of the first aspect, and/or the communications device is enabled to perform the method in any one of the second aspect or the possible implementations of the second aspect.

According to a seventh aspect, an embodiment of this application provides a computer-readable storage medium. The computer-readable storage medium stores a program. The program enables a communications device (for example, a terminal device or a network device) to perform the method in any one of the first aspect or the possible implementations of the first aspect, and/or enables a communications device to perform the method in any one of the second aspect or the possible implementations of the second aspect.

According to an eighth aspect, an embodiment of this application provides a computer program. When the computer program is run on a computer, the computer is enabled to perform the method in any one of the first aspect or the possible implementations of the first aspect, and/or the computer is enabled to perform the method in any one of the second aspect or the possible implementations of the second aspect.

BRIEF DESCRIPTION OF DRAWINGS

FIG. 9A and FIG. 9B are a schematic diagram of fourth-round synchronization during information synchronization according to this application;

DESCRIPTION OF EMBODIMENTS

To make the objectives, technical solutions, and advantages of this application clearer, the following further describes this application in detail with reference to the accompanying drawings. A specific operation method in a method embodiment may also be applied to a device embodiment or a system embodiment. In the description of this application, unless otherwise stated, "a plurality of" means two or more than two.

Figure 1:
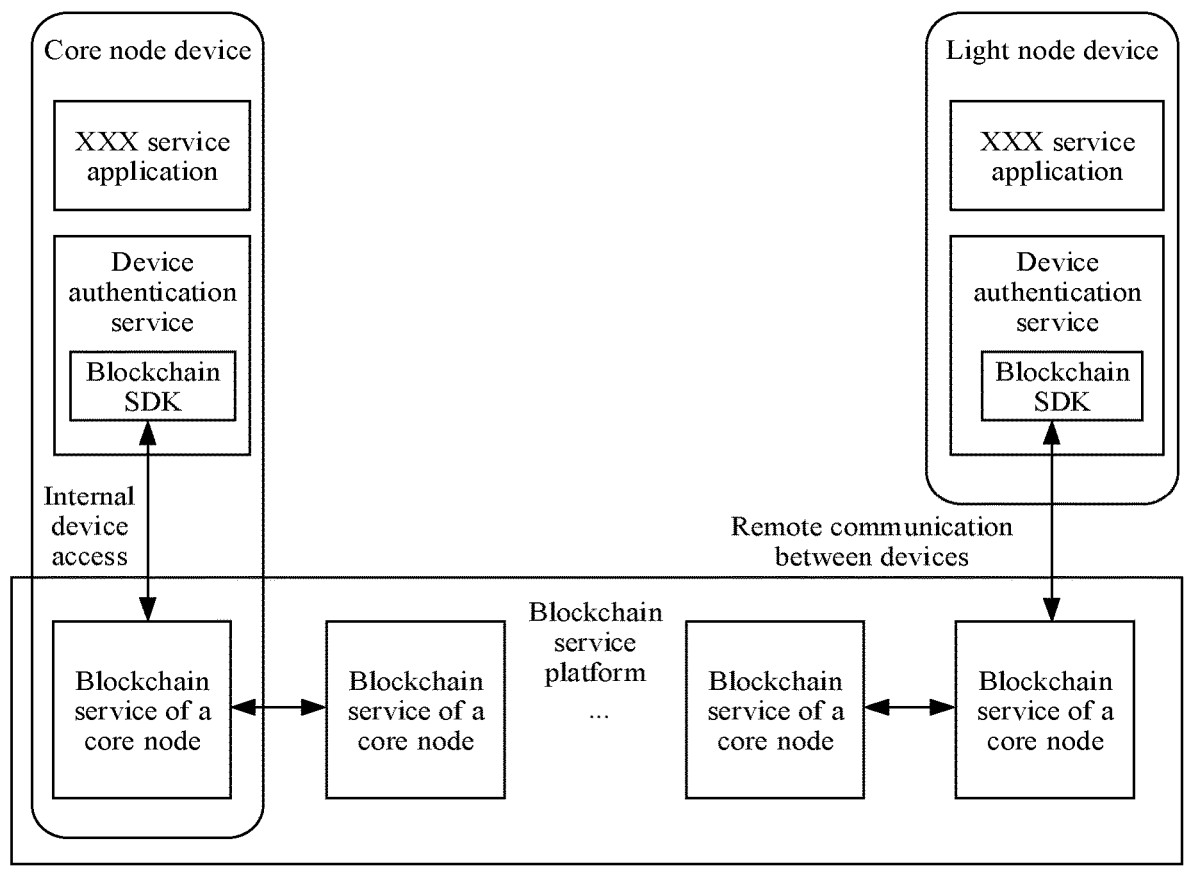
FIG. 1 is a schematic diagram of an architecture of an information synchronization system according to this application.

The embodiments of the present disclosure may be applied to various network systems in which a node information synchronization requirement is proposed, for example, a distributed network system including a plurality of nodes. A blockchain network architecture using a blockchain technology may be used for the distributed network system. FIG. 1 is a schematic diagram of an architecture of a blockchain network applied to this application. The blockchain network mainly includes a blockchain service platform, a core node device, and a light node device. The blockchain service platform mainly includes a chain that consists of a plurality of core nodes, to provide a blockchain service for the core node device and the light node device. For example, if block data of a core node on the blockchain service platform changes, to enable the blockchain service platform to normally provide a basic service externally, block data of another core node needs to be synchronized with changed data of the core node, and information synchronization needs to be performed, that is, information needs to be synchronized among the plurality of core nodes.

The following describes each component in the blockchain network architecture in FIG. 1 for ease of understanding.

(1) The blockchain service platform is a new application mode of computer technologies such as distributed data storage, point-to-point transmission, a consensus mechanism, and an encryption algorithm. The blockchain service platform essentially is a decentralized database. As an underlying bitcoin technology, the blockchain service platform is a series of data blocks generated through association using a cryptography method. Each data block contains a batch of bitcoin network transaction information for verifying validity (anti-counterfeiting) of information of the data block and generating a next block (a blockchain service of each core node in FIG. 1 is equivalent to one block).

(2) The core node is a node that is on the blockchain service platform and that has all blockchain capabilities, including all node management capabilities, transaction capabilities, consensus capabilities, and the like. The core nodes on the blockchain service platform have equivalence. To be specific, each core node stores all node list information in the entire network, and all the core nodes store the node list information in a same order.

(3) The core node device is a device that accesses, inside the device, the blockchain service platform using a blockchain software development kit (SDK) to obtain all blockchain services.

(4) The light node is a node that is on the blockchain service platform and that has only some blockchain capabilities, including some node management capabilities, transaction capabilities, communication capabilities, and the like.

(5) The light node device is a device that uses a blockchain SDK to obtain some blockchain services through remote device communication.

(6) The terms "system" and "network" may be used interchangeably in the embodiments of this application. The term "at least one" means one or more, and the term "a plurality of" means two or more than two. The term "and/or" describes an association relationship between associated objects and may indicate three relationships. For example, A and/or B may indicate the following cases: only A exists, both A and B exist, and only B exists, where A and B may be singular or plural. The character "/" generally indicates an "or" relationship between the associated objects. The term "at least one (one piece) of the following" or a similar expression thereof means any combination of these items, including any combination of a singular item (piece) or plural items (pieces). For example, at least one (one piece) of a, b, or c may indicate: a, b, c, a and b, a and c, b and c, or a, b, and c, where a, b, and c may be singular or plural.

Unless otherwise stated, in the embodiments of this application, ordinal numbers such as "first" and "second" are used to distinguish between a plurality of objects, and not intended to limit an order, a time sequence, priorities, or importance of the plurality of objects. For example, a first priority criterion and a second priority criterion are merely used to distinguish between different criteria, but do not indicate that the two criteria have different content, priorities, importance, or the like.

In addition, the terms "include" and "have" in the embodiments, claims, and accompanying drawings of this application are not exclusive. For example, a process, method, system, product, or device including a series of steps or modules is not limited to the listed steps or modules, and may further include a step or module that is not listed.

A method for synchronizing information by a node in a distributed network system is generally as follows. A node that has obtained updated content randomly selects N adjacent nodes as target nodes, and sends, based on a gossip protocol, a gossip message carrying the updated content. After receiving the gossip message, each of the N adjacent nodes compares data of the adjacent node with the updated content, and when a comparison result indicates that the data of the adjacent node is inconsistent with the updated content, updates, based on the updated data, the data stored in the adjacent node. After comparing the data stored in the adjacent node with the updated content, the adjacent node generates a response message and sends the response message to the node that sends the gossip message. After receiving the response message, the node that sends the gossip message parses the response message, and the current message sending process ends. Then, each of the N adjacent nodes serves as a node that has obtained the updated content, randomly selects N adjacent nodes as target nodes, and sends a gossip message carrying the updated content. A receiving node compares the received updated content with data stored in the receiving node, generates a response message, and sends the response message to the sending node. Then, the receiving node also becomes a node sending the updated content, and repeats the foregoing sending process. In this way, after the foregoing sending process is performed for a plurality of times, content of all nodes in an entire network is synchronized.

However, the foregoing information synchronization in the distributed network system has the following main problem. A sending node randomly selects a target node for content synchronization. Therefore, it is very likely that one target node may receive gossip messages sent from different nodes, and updated content carried in the different gossip messages is the same. This may cause a waste of resources in a content update process. Alternatively, some nodes are not selected as target nodes by any other node. As a result, these nodes cannot receive gossip messages all the time, and cannot update content. This may cause incomplete synchronization.

To resolve this problem, the embodiments of this application provide an information synchronization method. The information synchronization method may be applied to any distributed network architecture in which node information synchronization is required. A basic idea of the embodiments of this application is to maximally ensure, when information synchronization is performed in the distributed network architecture, that all target nodes on which information synchronization needs to be performed and that are selected by a node that sends updated content are nodes on which information synchronization is not performed.

To facilitate description of the embodiments of this application, in the following embodiments, a first node is a sending node, and a second node is a receiving node.

In this application, a first node that initiates information synchronization for the first time is referred to as a source node. That is, before the source node initiates information synchronization for the first time, all other nodes in a distributed network system are nodes on which information synchronization is not performed. In this case, the source node may randomly select, from the other nodes in the distributed network system, some nodes for information synchronization. After information synchronization is successfully completed, some nodes that are randomly selected by the first node become new first nodes, and continue to perform information synchronization until information synchronization is completed for all nodes in the entire distributed network system.

A node randomly selected by the first node for information synchronization may be referred to as a second node. When receiving a new gossip message, the second node first parses the received gossip message to determine updated content, and then compares data stored in the second node with the updated content. If the data stored in the second node includes the updated content, the second node sends, to the first node that sends the gossip message, a response message indicating an information synchronization failure, or if the data stored in the second node does not include the updated content, the second node sends, to the first node that sends the gossip message, a response message indicating information synchronization success, and updates data based on the updated content.

Two node information lists are maintained in the distributed network system, and are represented by a first node information list and a second node information list herein. When randomly selecting some nodes as target nodes for content synchronization, the first node in the distributed network system may determine, based on the first node information list and the second node information list, nodes on which content synchronization is not performed and that are in the distributed network system, and further select, from the determined nodes on which content synchronization is not performed, the target nodes for content synchronization. This can avoid a waste of resources caused by that some nodes are selected as target nodes for a plurality of times and a gossip message is repeatedly sent to some nodes, and can also avoid incomplete synchronization caused by that some nodes are not selected as target nodes all the time.

In this application, a plurality of improvement manners is proposed for information synchronization performed by a node in the distributed network system, and are separately described in specific embodiments.

Figure 2:
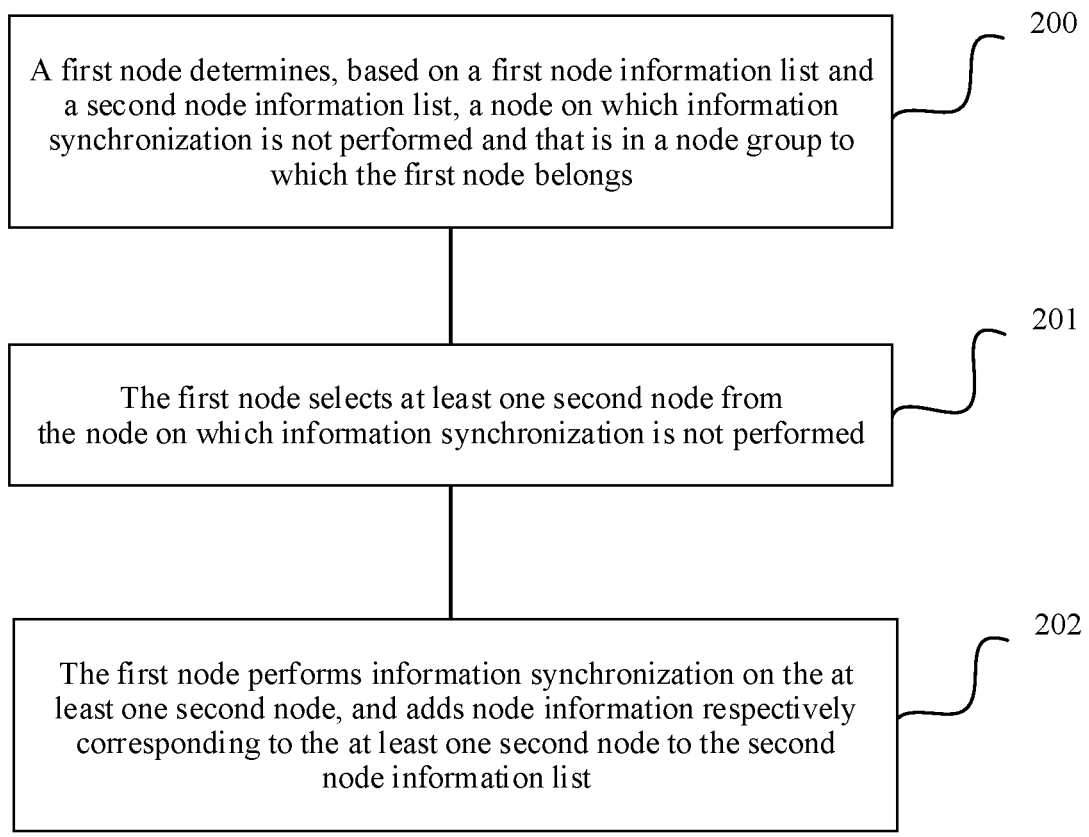
FIG. 2 is a schematic diagram of a first information synchronization method according to this application.

FIG. 2 shows an information synchronization method according to Embodiment 1 of the present disclosure. The method includes the following steps.

Step 200: A first node with an information synchronization capability determines, based on a first node information list and a second node information list, a node on which information synchronization is not performed and that is in a node group to which the first node belongs.

In a possible implementation, the first node information list includes node information of all nodes in the node group, and the second node information list includes node information of a node that is in the node group and on which information synchronization has been performed.

Step 201: The first node selects at least one second node from the node on which information synchronization is not performed.

Step 202: The first node performs information synchronization on the at least one second node, and updates by adding node information respectively corresponding to the at least one second node to the second node information list.

A first node information list corresponding to a node in a current distributed network system needs to follow an equivalence rule, that is, content included in first node information lists corresponding to all nodes is the same and is in a same order. Therefore, in this embodiment of this application, a plurality of manners is provided for maintaining the first node information list by the distributed network system, and are separately described below.

In a maintenance manner 1, all the nodes in the distributed network system may share one first node information list.

If all the nodes in the distributed network system share one first node information list, the shared first node information list may be stored into a third-party storage device, for example, a cloud storage device, that can be accessed by all the nodes. When a node in the distributed network system needs to invoke the first node information list, the node may obtain the first node information list by remotely accessing the third-party storage device. This can reduce usage of local resources.

In a maintenance manner 2, each node in the distributed network system maintains one first node information list.

If each node in the distributed network system maintains one first node information list, the first node information list corresponding to each node may be stored into local storage space corresponding to the node. When a node in the distributed network system needs to invoke a first node information list, the node may directly obtain the first node information list from corresponding local storage space. This can improve an invocation speed.

Further, in the information synchronization method provided in Embodiment 1 of this application, all the nodes in the distributed network system may also share one second node information list, and the second node information list includes information of all nodes on which content synchronization has been performed and that are in the entire distributed network system. Therefore, in the distributed network system in Embodiment 1 of this application, when the second node information list is maintained, the shared second node information list may be stored into a third-party storage device, for example, a cloud storage device, that can be accessed by all the nodes. When a node in the distributed network system needs to invoke the second node information list, the node may obtain the second node information list by remotely accessing the third-party storage device. This can reduce usage of local resources.

That is, in Embodiment 1 of this application, during information synchronization, information of a node that is randomly selected by each first node serving as a sender and on which content update has been performed is stored into the shared second node information list.

For example, it is assumed that the distributed network system currently includes 10 nodes, and a node 1 is a source node. Table 1 below is a shared first node information list in the current distributed network system, and Table 2(a) is a shared second node information list in an initial state when information synchronization is not performed in the current distributed network system.

It is assumed that, during first-round information synchronization, the node 1 selects a node 3 and a node 5 for content synchronization. After selecting the node 3 and the node 5, the node 1 stores node information of the node 1, the node 3, and the node 5 into the shared second node information list. In this case, after the first-round content synchronization, updated node information in the shared second node information list is shown in Table 2(b). After the node 1 successfully performs information synchronization on the node 3 and the node 5, the node 3 and the node 5 become new first nodes, and continue to perform content update. Based on the shared second node information list shown in Table 2(b) and the shared first node information list shown in Table 1, it may be determined that nodes on which content synchronization is not performed include a node 2, a node 4, and a node 6 to a node 10.

It should be noted that, in Embodiment 1 of this application, the source node may store, only when selecting, for the first time, a node for information synchronization, node information of the source node and information of the node selected for information synchronization into the shared second node information list. Subsequently, the source node does not need to store the node information of the source node into the shared second node information list, or stores only information of a node selected for information synchronization into the shared second node information list.

It is assumed that, during second-round information synchronization, the first node 1 randomly selects the node 2 and the node 6, the first node 3 randomly selects the node 4 and the node 10, and the first node 5 randomly selects a node 8 and a node 9. After selecting the node 2 and the node 6, the first node 1 stores node information of the node 2 and the node 6 into the shared second node information list. After selecting the node 4 and the node 10, the first node 3 stores node information of the node 4 and the node 10 into the shared second node information list. After selecting the node 8 and the node 9, the first node 5 stores node information of the node 8 and the node 9 into the shared second node information list. After the second-round information synchronization, updated node information in the shared second node information list is shown in Table 2(c). Therefore, based on the shared second node information list shown in Table 2(c) and the shared first node information list shown in Table 1, it may be determined that content update is not performed on only a node 7 in the distributed network system.

It is assumed that, during third-round information synchronization, first nodes currently serving as senders include the node 1 to the node 6 and the node 8 to the node 10, and content update is not performed on only the node 7. Therefore, in an information synchronization process in the distributed network system, a plurality of first nodes may select one node on which content update is not performed, to perform information synchronization. For example, the first node 1 to the first node 6 and the node 8 to the node 10 all select the node 7 for information synchronization, and store node information of the node 7 into the shared second node information list.

It should be noted that, when node information to be stored into the shared second node information list already exists in the shared second node information list, the node information is not repeatedly stored.

If the first node 1 to the first node 6 and the node 8 to the node 10 all select the node 7 for information synchronization, and the node 3 successfully performs information synchronization on the node 7 first, the node 7 sends, to the node 3, a response message indicating information synchronization success. After receiving the response message indicating information synchronization success, the node 3 still has a capability of performing information synchronization, and may further continue to perform information synchronization on a node on which content update is not performed and that is in the distributed network system.

In this case, when the node 1, the node 2, the node 4 to the node 6, and the node 8 to the node 10 perform information synchronization on the node 7, because content update has been completed for the node 7 before the node 1, the node 2, the node 4 to the node 6, and the node 8 to the node 10 perform information synchronization, the node 7 may determine, after separately parsing received gossip messages sent by the node 1, the node 2, the node 4 to the node 6, and the node 8 to the node 10, determining updated content, and comparing data stored in the node 7 with the updated content, that the data of the node 7 already includes the updated content before information synchronization is performed. Therefore, a response message indicating an information synchronization failure is sent to each of the node 1, the node 2, the node 4 to the node 6, and the node 8 to the node 10. After receiving the response message that indicates an information synchronization failure and that is sent by the node 7, the node 1, the node 2, the node 4 to the node 6, and the node 8 to the node 10 lose the capability of continuing to perform information synchronization, and stop information synchronization.

In this case, in the entire distributed network system, only the node 3 and the node 7 have the capability of performing information synchronization. During fourth-round information synchronization, updated node information in the shared second node information list is shown in Table 2(d). Based on the shared second node information list shown in Table 2(d) and the shared first node information list shown in Table 1, it may be learned that no node on which information synchronization is not performed exists in the current distributed network system. Therefore, the node 3 and the node 7 may stop information synchronization.

TABLE 1

| First node information list |
| --- |
| First node information list |
| Information of the node 1 |
| Information of the node 2 |
| Information of the node 3 |
| Information of the node 4 |
| Information of the node 5 |
| Information of the node 6 |
| Information of the node 7 |
| Information of the node 8 |
| Information of the node 9 |
| Information of the node 10 |

TABLE 2(a)

| Second node information list |
| --- |
| Second node information list |
| — |

TABLE 2(b)

| Second node information list |
| --- |
| Second node information list |
| Information of the node 1 |
| Information of the node 3 |
| Information of the node 5 |

TABLE 2(c)

| Second node information list |
| --- |
| Second node information list |
| Information of the node 1 |
| Information of the node 2 |
| Information of the node 3 |
| Information of the node 4 |
| Information of the node 5 |
| Information of the node 6 |
| Information of the node 8 |
| Information of the node 9 |
| Information of the node 10 |

TABLE 2(d)

| Second node information list |
| --- |
| Second node information list |
| Information of the node 1 |
| Information of the node 2 |
| Information of the node 3 |
| Information of the node 4 |
| Information of the node 5 |
| Information of the node 6 |
| Information of the node 7 |
| Information of the node 8 |
| Information of the node 9 |
| Information of the node 10 |

Figure 3:
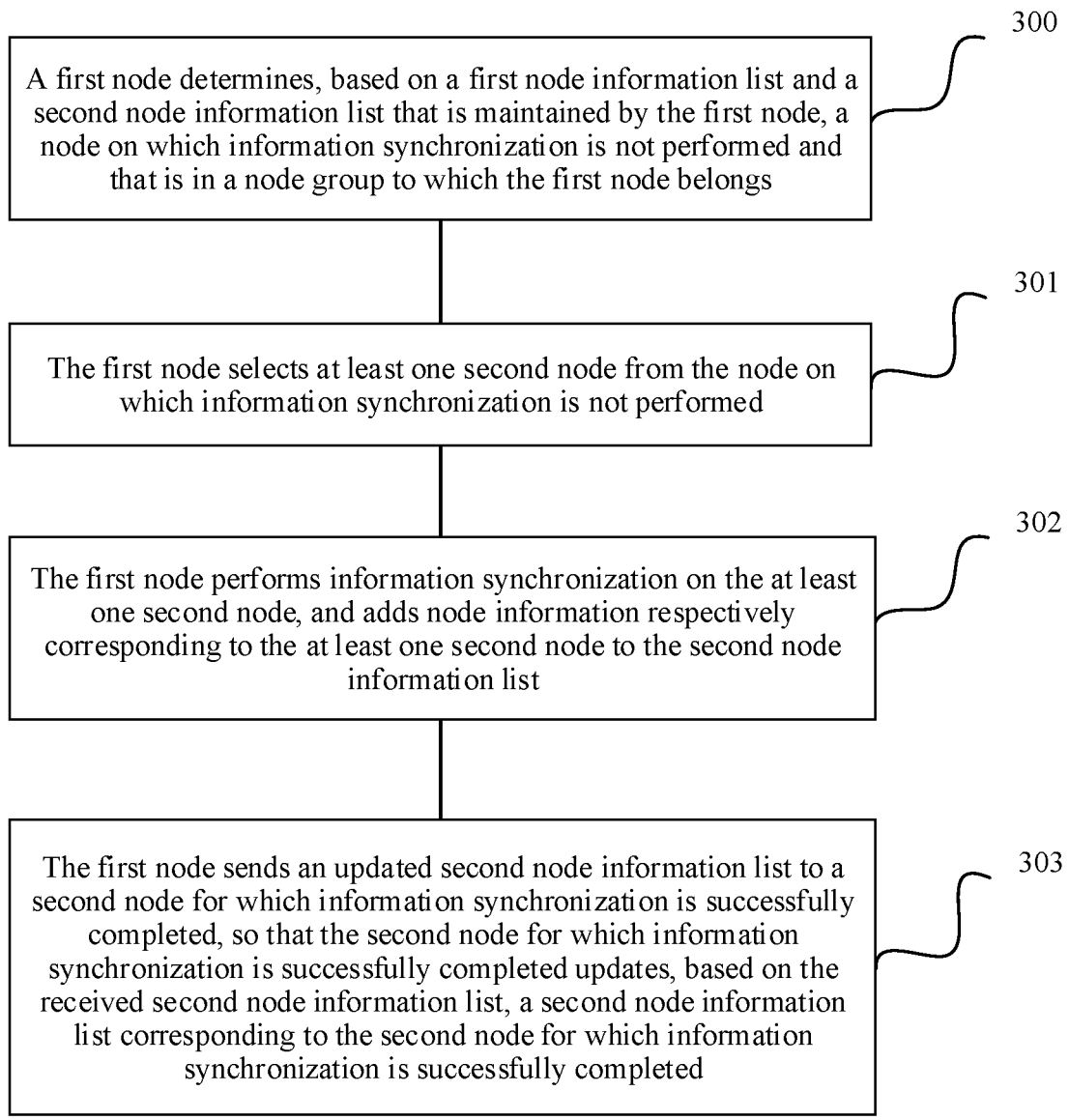
FIG. 3 is a schematic diagram of a second information synchronization method according to this application.

FIG. 3 shows an information synchronization method according to Embodiment 2 of the present disclosure. The method includes the following steps.

Step 300: A first node with an information synchronization capability determines, based on a first node information list and a second node information list that is maintained by the first node, a node on which information synchronization is not performed and that is in a node group to which the first node belongs.

In an example, the first node information list includes node information of all nodes in the node group, and the second node information list includes node information that is learned by the first node and that is of a node on which information synchronization has been performed.

It should be noted that content included in the second node information list herein may be different from content included in the second node information list in Embodiment 1.

Step 301: The first node selects at least one second node from the node on which information synchronization is not performed.

Step 302: The first node performs information synchronization on the at least one second node, and updates by adding node information respectively corresponding to the at least one second node to the second node information list.

Step 303: The first node sends an updated second node information list to a second node for which information synchronization is successfully completed such that the second node for which information synchronization is successfully completed updates, based on the received second node information list, a second node information list maintained by the second node for which information synchronization is successfully completed.

A first node information list corresponding to a node in a current distributed network system needs to follow an equivalence rule, that is, content included in first node information lists corresponding to all nodes is the same and is in a same order. Therefore, in Embodiment 2 of this application, a plurality of manners is provided for maintaining the first node information list by the distributed network system, and are separately described below.

In a maintenance manner 1, all the nodes in the distributed network system may share one first node information list.

If all the nodes in the distributed network system share one first node information list, the shared first node information list may be stored into a third-party storage device, for example, a cloud storage device, that can be accessed by all the nodes. When a node in the distributed network system needs to invoke the first node information list, the node may obtain the first node information list by remotely accessing the third-party storage device. This can reduce usage of local resources.

In a maintenance manner 2, each node in the distributed network system maintains one first node information list.

If each node in the distributed network system maintains one first node information list, the first node information list maintained by each node may be stored into local storage space corresponding to the node. When a node in the distributed network system needs to invoke a first node information list, the node may directly obtain the first node information list from corresponding local storage space. This can improve an invocation speed.

Further, in the information synchronization method provided in Embodiment 2 of this application, each node in the distributed network system maintains one second node information list. The second information list includes only node information that is learned by the node and that is of a node on which information synchronization has been performed. The second information list maintained by each node is updated each time information synchronization is performed.

For example, in the distributed network system in Embodiment 2 of this application, when the second node information list is maintained, the second node information list maintained by each node may be stored, based on a corresponding node identifier, into a third-party storage device, for example, a cloud storage device, that can be accessed by all the nodes. When a node in the distributed network system needs to invoke a corresponding second node information list, the node may obtain the corresponding second node information list based on a node identifier of the node by remotely accessing the third-party storage device. This can reduce usage of local resources.

That is, in Embodiment 2 of this application, during information synchronization, information of a node that is randomly selected by each first node serving as a sender and on which content update has been performed is stored into a second node information list corresponding to the first node.

For example, it is assumed that the distributed network system currently includes 10 nodes, and a node 1 is a source node. A first node information list corresponding to the node 1 is shown in Table 1. When the node 1 does not perform information synchronization, in an initial state, a second node information list corresponding to the node 1 is shown in Table 2(a).

It is assumed that, during first-round information synchronization, the node 1 selects a node 3 and a node 5 for information synchronization. After selecting the node 3 and the node 5, the node 1 stores node information of the node 1, the node 3, and the node 5 into the second node information list corresponding to the node 1. After successfully performing information synchronization on the node 3 and the node 5, the node 1 sends an updated second node information list corresponding to the node 1 to the node 3 and the node 5. After receiving the second node information list sent by the node 1, the node 3 and the node 5 update their corresponding second node information lists to the received second node information list that corresponds to the node 1 and that is sent by the node 1, that is, Table 2(b).

In this case, after the first-round information synchronization, based on the first node information list corresponding to the node 1 and the second node information list corresponding to the node 1, it may be determined that nodes that correspond to the node 1 and on which information synchronization is not performed are a node 2, a node 4, and a node 6 to a node 10. Based on a first node information list corresponding to the node 3 and the second node information list corresponding to the node 3, it may be determined that nodes that correspond to the node 3 and on which information synchronization is not performed are the node 2, the node 4, and the node 6 to the node 10. Base on a first node information list corresponding to the node 5 and the second node information list corresponding to the node 5, it may be determined that nodes that correspond to the node 5 and on which information synchronization is not performed are the node 2, the node 4, and the node 6 to the node 10.

It should be noted that, in Embodiment 2 of this application, the source node may store, only when selecting, for the first time, a node for information synchronization, node information of the source node and information of the node selected for information synchronization into a second node information list maintained by the source node. Subsequently, another node serving as a synchronizing node does not need to store node information of the other node into a second node information list maintained by the other node, or stores only information of a node selected for information synchronization into a second node information list maintained by the other node.

It is assumed that, during second-round information synchronization, the first node 1 randomly selects the node 2 and the node 6 for content update, the first node 3 randomly selects the node 4 and the node 10 for content synchronization, and the first node 5 randomly selects a node 8 and a node 9 for content synchronization. After selecting the node 2 and the node 6, the first node 1 stores information of the node 2 and the node 6 into the second node information list corresponding to the first node 1. After successfully performing information synchronization on the node 2 and the node 6, the first node 1 sends an updated second node information list corresponding to the node 1 to the node 2 and the node 6. After receiving the second node information list sent by the node 1, the node 2 and the node 6 update their corresponding second node information lists to the received second node information list that corresponds to the node 1 and that is sent by the node 1, that is, Table 2(e).

Likewise, after selecting the node 4 and the node 10, the first node 3 stores information of the node 4 and the node 10 into the second node information list corresponding to the first node 3. After successfully performing information synchronization on the node 4 and the node 10, the first node 3 sends a second node information list corresponding to the node 3 to the node 4 and the node 10. After receiving the second node information list sent by the node 3, the node 4 and the node 10 update their corresponding second node information lists to the received second node information list that corresponds to the node 3 and that is sent by the node 3, that is, Table 2(f).

Likewise, after selecting the node 8 and the node 9, the first node 5 stores information of the node 8 and the node 9 into the second node information list corresponding to the first node 5. After successfully performing information synchronization on the node 8 and the node 9, the first node 5 sends a second node information list corresponding to the node 5 to the node 8 and the node 9. After receiving the second node information list sent by the node 5, the node 8 and the node 9 update their corresponding second node information lists to the received second node information list that corresponds to the node 5 and that is sent by the node 5, that is, Table 2(g).

It is assumed that, during third-round information synchronization, first nodes currently serving as senders are the node 1 to the node 6 and the node 8 to the node 10. Based on first node information lists corresponding to the first node 1, the node 2, and the node 6, and the second node information lists corresponding to the first node 1, the node 2, and the node 6, it may be determined that nodes that correspond to the node 1, the node 2, and the node 6 and on which information synchronization is not performed are the node 4 and a node 7 to the node 10. Based on first node information lists corresponding to the first node 3, the node 4, and the node 10, and the second node information lists corresponding to the first node 3, the node 4, and the node 10, it may be determined that nodes that correspond to the node 3, the node 4, and the node 10 and on which information synchronization is not performed are the node 2 and the node 6 to the node 9. Base on first node information lists corresponding to the first node 5, the node 8, and the node 9, and the second node information lists corresponding to the first node 5, the node 8, and the node 9, it may be determined that nodes that correspond to the node 5, the node 8, and the node 9 and on which information synchronization is not performed are the node 2, the node 4, the node 6, the node 7, and the node 10.

It is assumed that the first node 1 randomly selects, from the node 4 and the node 7 to the node 10 that correspond to the first node 1 and on which content update is not performed, the node 4 and the node 7 for information synchronization, and stores information of the node 4 and the node 7 into the second node information list corresponding to the node 1. After successfully performing information synchronization on the node 7, the node 1 sends an updated second node information list corresponding to the node 1 to the node 7. After receiving the second node information list sent by the node 1, the node 7 updates a second node information list corresponding to the node 7 to the received second node information list that corresponds to the node 1 and that is sent by the node 1, that is, Table 2(h).

Although the nodes that correspond to the node 1 and on which content update is not performed include the node 4, the node 3 has successfully completed information synchronization for the node 4 in a second-round information synchronization process. Therefore, updated content is already included in the node 4. Therefore, when performing information update on the node 4, the node 1 receives a response message that indicates an information synchronization failure and that is sent by the node 4. Therefore, after receiving the response message indicating an information synchronization failure, the first node 1 loses a capability of performing information synchronization, and stops information synchronization.

Likewise, it is assumed that the node 1 has successfully performed information synchronization on the node 7. Therefore, regardless of which node is selected, for information synchronization, by each of the first node 2 to the first node 6 and the first node 8 to the first node 10 from nodes that correspond to the first node and on which content update is not performed, the first node receives a response message that indicates an information synchronization failure and that is sent by the corresponding synchronized node. Therefore, the first node 2 to the first node 6 and the first node 8 to the first node 10 all lose the capability of performing information synchronization, and stop information synchronization.

In this case, in the entire distributed network system, only the node 7 has the capability of performing information synchronization. During fourth-round information synchronization, based on the first node information list and the second node information list corresponding to the node 7, it may be determined that nodes that correspond to the node 7 and on which information synchronization is not performed are the node 8 to the node 10. It is assumed that the first node 7 randomly selects, from the node 8 to the node 10 that correspond to the first node 7 and on which content update is not performed, the node 8 and the node 10 for information synchronization, and stores information of the node 8 and the node 10 into the second node information list corresponding to the node 7. The updated content is already included in the node 8 and the node 10. Therefore, when performing information update on the node 8 and the node 10, the node 7 also receives response messages that indicate an information synchronization failure and that are sent by the node 8 and the node 10. Therefore, the first node 7 also loses the capability of performing information synchronization, and stops information synchronization.

In this case, no node having the capability of performing information synchronization exists in the entire distributed network system, and information synchronization is stopped in the entire distributed network system.

TABLE 2(e)

| Second node information lists corresponding to node 1, node 2, and node 6 |
| --- |
| Second node information list |
| Information of the node 1 |
| Information of the node 2 |
| Information of the node 3 |
| Information of the node 5 |
| Information of the node 6 |

TABLE 2(f)

| Second node information lists corresponding to node 3, node 4, and node 10 |
| --- |
| Second node information list |
| Information of the node 1 |
| Information of the node 3 |
| Information of the node 4 |
| Information of the node 5 |
| Information of the node 10 |

TABLE 2(g)

| Second node information lists corresponding to node 5, node 8, and node 9 |
| --- |
| Second node information list |
| Information of the node 1 |
| Information of the node 3 |
| Information of the node 5 |
| Information of the node 8 |
| Information of the node 9 |

TABLE 2(h)

| Second node information lists corresponding to node 1 and node 7 |
| --- |
| Second node information list |
| Information of the node 1 |
| Information of the node 2 |
| Information of the node 3 |
| Information of the node 4 |
| Information of the node 5 |
| Information of the node 6 |
| Information of the node 7 |

It can be learned from the content of Embodiment 1 and Embodiment 2 of this application that, when information synchronization is performed in the distributed network system, when the first node in the distributed network system stops information synchronization and when information synchronization is stopped in the entire distributed network system are determined mainly in two manners.

In one manner, if the first node in the distributed network system loses the capability of performing information synchronization, the first node stops information synchronization. Further, if all first nodes in the entire distributed network system lose the capability of performing information synchronization, information synchronization is stopped in the entire distributed network system.

In the other manner, if the first node in the distributed network system has no corresponding node on which content update is not performed, the first node stops information synchronization, that is, if the first node information list corresponding to the first node contains same node information as that contained in the second node information list corresponding to the first node, the first node stops information synchronization.

Further, if all first nodes in the entire distributed network system have no corresponding node on which content update is not performed, information synchronization is stopped in the entire distributed network system.

Further, this reduces an average value and a variance value of a quantity of information synchronization times of each node, reduces overall power consumption of the entire system, and avoids excessively high power consumption of a node in the system.

In Embodiment 1 and/or Embodiment 2 of this application, an information synchronization operation may be further suspended for some first nodes in the entire distributed network system.

In Embodiment 1 and/or Embodiment 2 of this application, a first node that needs to suspend information synchronization may be determined in, but not limited to, the following manners When a quantity of times that a first node continuously performs information synchronization is not less than a first threshold, the first node temporarily loses the information synchronization capability. In Embodiment 1 of this application, the first threshold is a maximum quantity of times that a node continuously performs information synchronization.

For example, it is assumed that the first threshold is 3. When a first node continuously performs information synchronization for three times, the first node needs to temporarily lose the capability of performing information synchronization on another node. After specific suspension duration, the first node may repossess the capability of performing information synchronization on the other node, and continue to randomly select, from corresponding nodes on which content update is not performed, a node on which content update is not performed, to perform information synchronization.

It should be noted that, in Embodiment 1 and/or Embodiment 2 of this application, when an information synchronization operation is suspended for a first node, as an accumulated quantity of times of information synchronization performed by the first node increases, duration in which the first node suspends information synchronization may also continuously increase.

Further, in Embodiment 1 and/or Embodiment 2 of this application, the duration in which the first node suspends information synchronization may be determined based on the following formula 1:

$$t = n(M-1).$$ (Formula 1)

In the formula 1, M indicates an accumulated quantity of times of information synchronization performed by a node, t indicates required duration in which a first node suspends an information synchronization operation, n is a positive number, and n may be a value such as 0.2.

Based on Embodiment 1 and Embodiment 2 of this application, in Embodiment 3, information synchronization may alternatively be performed by grouping nodes in a node group. In this way, when a first node in the distributed network system randomly selects a node on which content update is not performed, to perform information synchronization, a first node in each group only needs to perform information synchronization on a node on which content update is not performed and that is in the group to which the first node belongs. Therefore, the first node does not need to determine a node on which content update is not performed and that is in the entire distributed network system. In this way, the first node only needs to consider a relatively small quantity of nodes on which content update is not performed, and first nodes in a plurality of groups simultaneously perform information synchronization on nodes on which content update is not performed and that are in the groups to which the first nodes belong. This can implement concurrent information synchronization, and improve information synchronization efficiency.

The node group includes all nodes in the network system, or the node group is a node group obtained after all nodes in the network system are grouped.

Figure 4A:
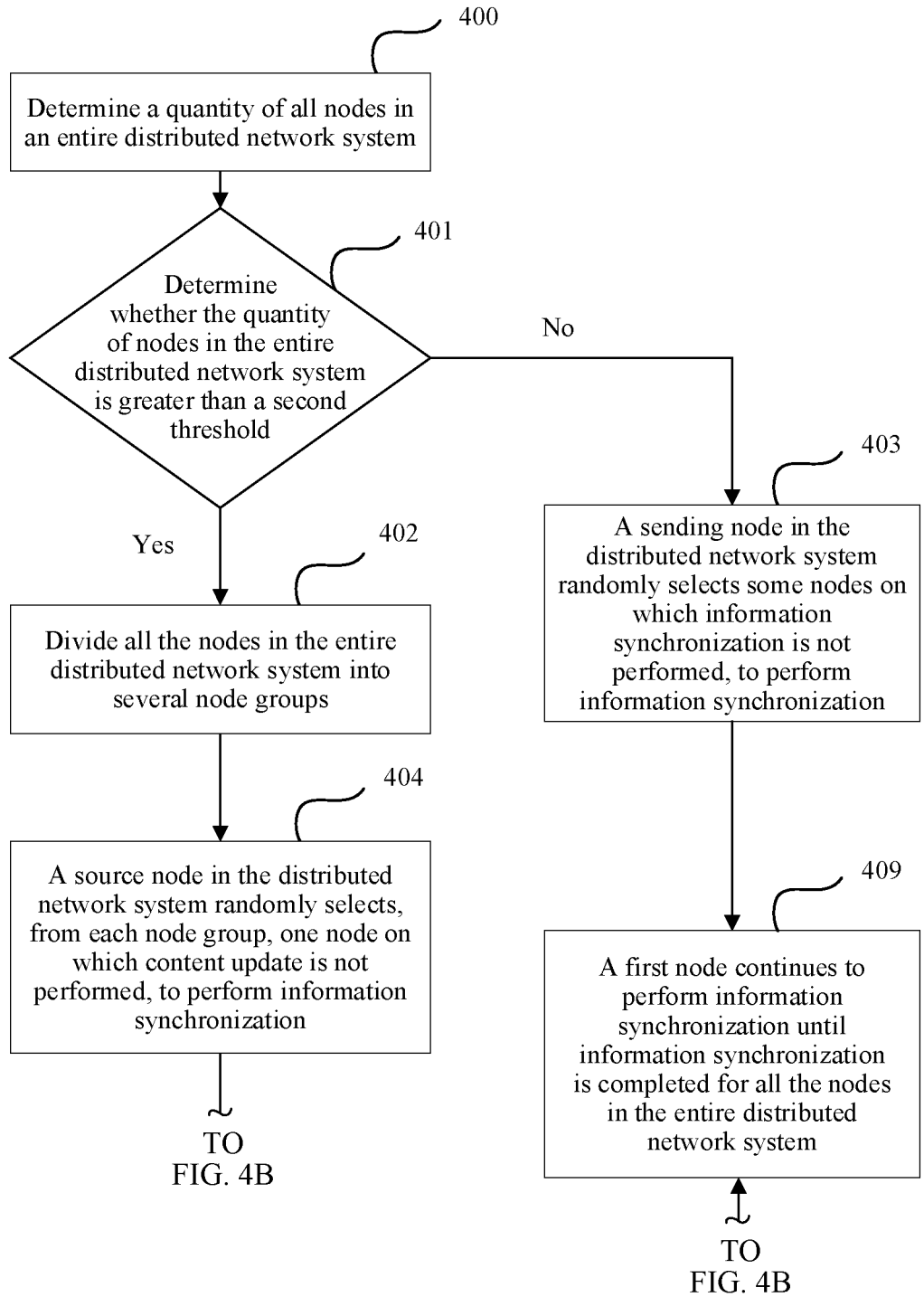
FIG. 4A and FIG. 4B are a schematic flowchart of performing information synchronization in a grouping manner according to this application.
Figure 4B:
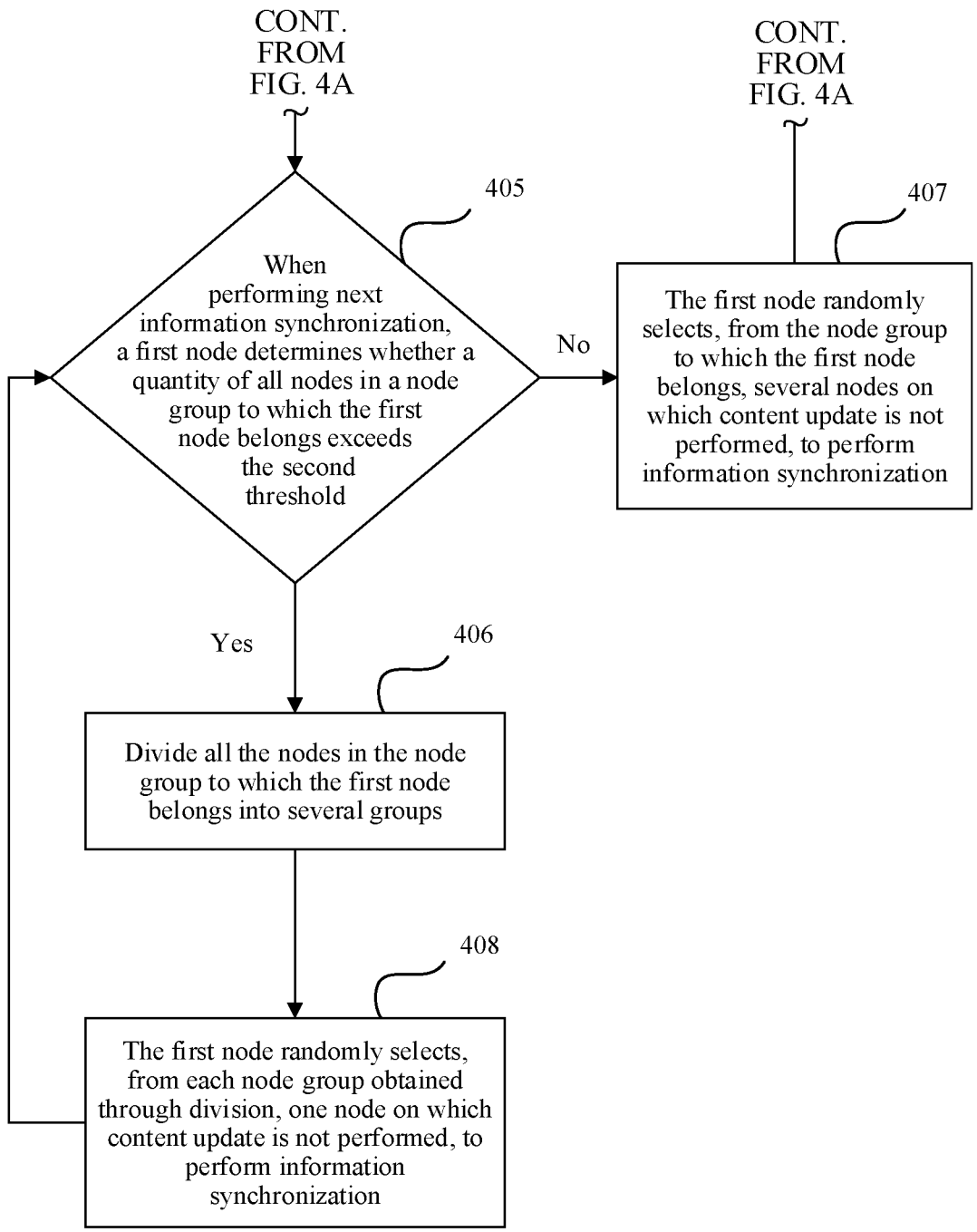

FIG. 4A and FIG. 4B show a process of synchronizing information by grouping nodes in an entire node group according to Embodiment 3 of the present disclosure. The process includes the following steps.

Step 400: Determine a quantity of all nodes in an entire distributed network system, and then perform step 401.

Step 401: Determine whether the quantity of all the nodes in the entire distributed network system is greater than a second threshold, and if the quantity of all the nodes in the entire distributed network system is greater than the second threshold, perform step 402, or if the quantity of all the nodes in the entire distributed network system is not greater than the second threshold, perform step 403.

The second threshold in Embodiment 3 of this application may be a preset maximum node quantity that is used to determine whether a grouping condition is met. To be specific, if a quantity of all nodes in a current node group exceeds the second threshold, the grouping condition is met, and all the nodes in the current node group are grouped. If a quantity of all nodes in a current node group does not exceed the second threshold, it is determined that the grouping condition is not met, and all the nodes in the current node group do not need to be grouped.

Step 402: Divide all the nodes in the entire distributed network system into several node groups, and then perform step 404.

Step 403: A source node in the distributed network system randomly selects several nodes on which content update is not performed, to perform information synchronization, and then performs step 409.

After the source node successfully performs information synchronization on a randomly selected node on which content update is not performed, the node on which information synchronization is successfully performed becomes a new first node.

Step 404: A source node in the distributed network system randomly selects, from each node group, one node on which content update is not performed, to perform information synchronization, and then performs step 405.

Step 405: When performing next information synchronization, a first node determines whether a quantity of all nodes in a node group to which the first node belongs exceeds the second threshold, and if the quantity of all the nodes in the node group to which the first node belongs exceeds the second threshold, performs step 406, or if the quantity of all the nodes in the node group to which the first node belongs does not exceed the second threshold, performs step 407.

Step 406: Divide all the nodes in the node group to which the first node belongs into several node groups, and then perform step 408.

Step 407: The first node randomly selects, from the nodes in the node group to which the first node belongs, several nodes on which content update is not performed, to perform information synchronization, and then performs step 409.

Step 408: The first node randomly selects, from each node group obtained through division, one node on which content update is not performed, to perform information synchronization, and then performs step 405.

Step 409: A first node continues to perform information synchronization until information synchronization is completed for all the nodes in the entire distributed network system.

It should be noted that a quantity of all nodes in a node group to which a node belongs may be determined based on a first node information list corresponding to the node.

In Embodiment 3 of this application, after all the nodes in the entire distributed network system are grouped, a first node information list corresponding to a node in each node group includes only information of all nodes in the node group. Likewise, if all nodes in a node group are further grouped, a first node information list corresponding to a node in each node group obtained through grouping includes only information of all nodes in the node group. For example, if nodes in a node group 1 are further grouped, where it is assumed that all the nodes in the node group 1 are divided into three groups: a node group a, a node group b, and a node group c, a first node information list corresponding to a node in the node group a includes only information of all nodes in the node group a.

If all the nodes in the distributed network system share one second node information list, in Embodiment 3 of this application, after all the nodes in the entire distributed network system are grouped, all nodes in each node group in the distributed network system share one second node information list, where the second information list includes only information of all nodes on which content synchronization has been performed and that are in the node group.

In Embodiment 3 of this application, information synchronization may be performed in a plurality of grouping manners. The following separately describes the plurality of grouping manners.

In a grouping manner 1, in Embodiment 3 of this application, after it is determined that grouping needs to be performed, based on a preset group quantity, all nodes in a current node group are evenly divided into groups of the preset group quantity.

For example, it is assumed that the preset group quantity is two, and the current node group includes 30 nodes in total. When an average grouping condition is met, the 30 nodes are evenly divided into two groups, and each group includes 15 nodes.

If all the nodes in the current node group cannot be evenly divided into the groups of the preset group quantity, grouping may be performed provided that a variance of a quantity of nodes in each new node group obtained after grouping is a minimum value.

For example, the preset group quantity is two, and there are 27 nodes in total in the current distributed network system. It is assumed that a quantity of nodes in a first group is $x_1$, and a quantity of nodes in a second group is $x_2$, where an average quantity of nodes in each group is 13.5. Then, based on a variance formula in a formula 2:

$$s^2 = \frac{(x_1 - M)^2 + (x_2 - M)^2 + (x_3 - M)^2 + \ldots + (x_n - M)^2}{n}. \quad \text{Formula 2}$$

A formula 3 may be obtained:

$$s^2 = \frac{(x_1 - 13.5)^2 + (x_2 - 13.5)^2}{n}. \quad \text{Formula 3}$$

A value of a final variance $s^2$ is related to values of $(x_1-13.5)^2$ and $(x_2-13.5)^2$. Therefore, smaller values of $(x_1-13.5)^2$ and $(x_2-13.5)^2$ indicate a smaller variance, and a node quantity needs to be an integer. Therefore, a minimum variance can be obtained only when $x_1=14$ and $x_2=13$ or when $x_1=13$ and $x_2=14$, and is 0.25. Therefore, the 27 nodes in the node group may be finally divided into two groups, where one group includes 14 nodes, and the other group includes 13 nodes.

In a grouping manner 2, in Embodiment 3 of this application, after it is determined that grouping needs to be performed, grouping is performed based on the set second threshold. Nodes whose quantity is equal to the second threshold are randomly selected from all nodes in a current node group and are used as one group, until a quantity of remaining nodes is less than the second threshold. Then, the remaining nodes are used as one group, or the remaining nodes are randomly added to one existing group.

For example, it is assumed that the set second threshold is 10, and the current node group includes 29 nodes in total. 10 nodes are randomly selected from the 29 nodes as a first group of nodes, 10 nodes are randomly selected from remaining 19 nodes as a second group of nodes, and then remaining nine nodes are used as a third group of nodes. In this case, the 29 nodes are divided into three groups in total.

For another example, it is assumed that the set threshold is 10, and the current node group includes 29 nodes in total. 10 nodes are randomly selected from the 29 nodes as a first group of nodes, 10 nodes are randomly selected from remaining 19 nodes as a second group of nodes, and then remaining nine nodes are randomly added to the first group or the second group, for example, to the second group. In this case, the 29 nodes are divided into two groups in total, where the first group includes 10 nodes, and the second group includes 19 nodes.

Further, in Embodiment 3 of this application, after the first-round grouping is completed, the source node randomly selects, from each node group, one node on which content update is not performed, to perform first-round information synchronization. When the first-round information synchronization is completed and second-round information synchronization needs to be performed, a first node needs to determine whether a quantity of all nodes in a node group to which the first node currently belongs exceeds a first threshold. If the quantity of all the nodes in the node group to which the first node currently belongs exceeds the first threshold, the first node further groups all the nodes in the node group to which the first node currently belongs, and randomly selects, from each new node group, a node on which content update is not performed, to perform information synchronization. If the quantity of all the nodes in the node group to which the first node currently belongs does not exceed the first threshold, the first node directly and randomly selects, from the node group to which the first node belongs, a node on which content update is not performed, to perform information synchronization. The foregoing node content synchronization process is continuously performed by analogy, until information synchronization is completed for all the nodes in the entire distributed network system.

Based on Embodiment 2, the following describes Embodiment 3 of the present disclosure with reference to FIG. 5 to FIG. 10.

Figure 5:
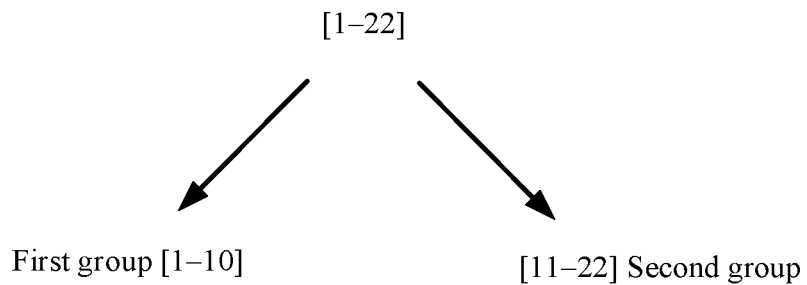
FIG. 5 is a schematic diagram of randomly selecting, by a source node, some nodes from each group for information synchronization according to this application.

As shown in FIG. 5, it is assumed that there are 22 nodes in a current distributed network system in total, a source node is a node 2, a set first threshold is 2, a set second threshold is 10, and all the nodes in the distributed network system are divided into two groups in the foregoing grouping manner 2: a first group including a node 1 to a node 10, and a second group including a node 11 to a node 22.

It should be noted that a symbol R in the accompanying drawings indicates that a second node determines, after parsing a received gossip message sent by a first node, determining updated content, and comparing data stored in the second node with the updated content, that the data of the second node does not include the updated content before information synchronization is performed, that is, the first node successfully performs the current information synchronization, and still has a capability of performing information synchronization. A symbol E indicates that a second node determines, after parsing a received gossip message sent by a first node, determining updated content, and comparing data stored in the second node with the updated content, that the data of the second node already includes the updated content before information synchronization is performed, that is, the first node fails to perform the current information synchronization, loses the capability of performing information synchronization, and stops information synchronization.

Figure 6:
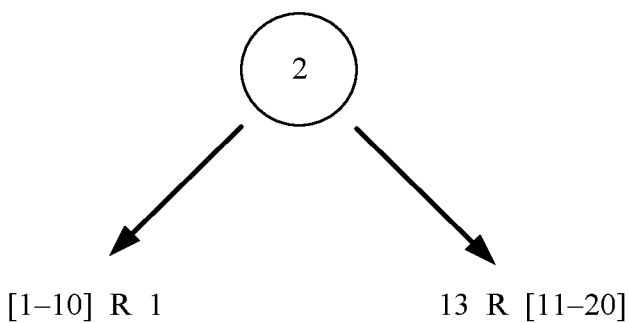
FIG. 6 is a schematic diagram of first-round synchronization during information synchronization according to this application.

It is assumed that, as shown in FIG. 6, during first-round information synchronization, the source node 2 randomly selects, from each of the first group and the second group, one node on which content update is not performed, to perform information synchronization. For example, nodes that are randomly selected by the source node 2 and on which content update is not performed are the node 1 and a node 13. After the source node 2 successfully completes information synchronization for the node 1 and the node 13, the node 1 and the node 13 each also become a first node, and continue to randomly select, from the respective group, a node on which content update is not performed, to perform information synchronization.

During second-round information synchronization, a first node needs to determine whether a quantity of all nodes in a group to which the first node currently belongs exceeds the first threshold. A quantity of all the nodes in the second group to which the first node 13 currently belongs is 12, and is greater than the first threshold 10. In this case, the first node 13 further groups all the nodes in the second group to which the first node 13 belongs. For example, the first node 13 further divides all the nodes in the second group to which the first node 13 belongs into two groups: a third group including the node 11 to a node 20, and a fourth group including a node 21 and the node 22. After grouping is completed, the first node 13 randomly selects, from each of the third group and the fourth group, one node on which content update is not performed, to perform information synchronization.

Figure 7:
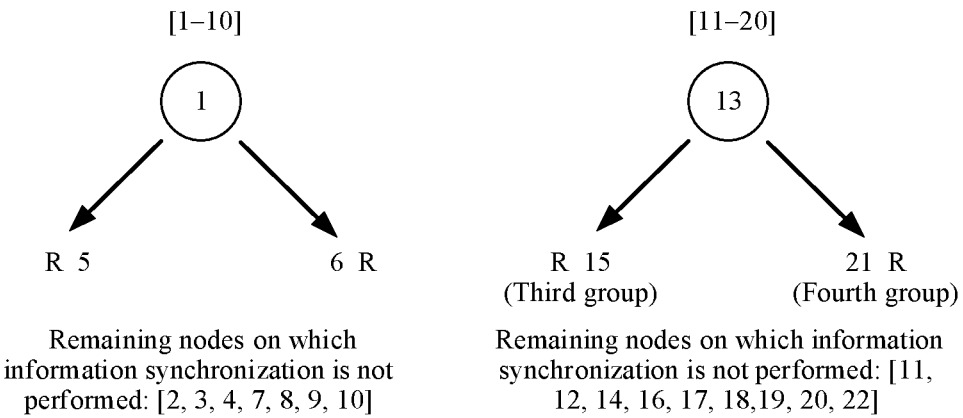
FIG. 7 is a schematic diagram of second-round synchronization during information synchronization according to this application.

As shown in FIG. 7, it is assumed that nodes that are randomly selected by the first node 13 from the third group and the fourth group and on which content update is not performed are a node 15 and the node 21. After the first node 13 successfully completes information synchronization for the node 15 and the node 21, the node 15 and the node 21 also become first nodes, and node information included in second node information lists corresponding to the node 13 and the node 15 is [13, 15]. Based on a first node information list, it can be learned that nodes that correspond to the node 13 and the node 15 and on which information synchronization is not performed are [11, 12, 14, 16, 17, 18, 19, 20].

A node included in a second node information list corresponding to the node 21 is [21]. Based on a first node information list, it can be learned that a node that corresponds to the node 21 and on which information synchronization is not performed is [22]. In this case, after the second-round information synchronization is completed, the node 13 has performed information synchronization twice consecutively, that is, the first threshold 2 is reached. Therefore, the node 13 needs to suspend information synchronization for specific duration before performing next information synchronization, and the specific suspension duration may be 0.2 second.

A quantity of all the nodes in the first group to which the first node 1 currently belongs is 10, and is not greater than the first threshold 10. In this case, the first node 1 directly and randomly selects, from the first group, a node on which content update is not performed, to perform information synchronization. It is assumed that nodes that are randomly selected by the first node from the first group and on which content update is not performed are a node 5 and a node 6. After the first node 1 successfully completes information synchronization for the node 5 and the node 6, the node 5 and the node 6 also become first nodes, and node information included in second node information lists corresponding to the node 1, the node 5, and the node 6 is [1, 5, 6]. Based on a first node information list, it can be learned that nodes that correspond to the node 1, the node 5, and the node 6 and on which information synchronization is not performed are [2, 3, 4, 7, 8, 9, 10].

In this case, after the second-round information synchronization is completed, a quantity of nodes in each group is not greater than the set second threshold 10. Therefore, no grouping needs to be performed in a subsequent information synchronization process. The node 5 and the node 6 in the first group become the new first nodes, and continue to perform information synchronization. In this case, response messages returned by the node 5 and the node 6 and received by the node 1 are both R, that is, the node 1 successfully completes information synchronization for the node 5 and the node 6, and the node 1 may continue to perform information synchronization. However, in this case, the node 1 has performed information synchronization twice consecutively, that is, the first threshold 2 is reached. Therefore, the node 1 needs to suspend information synchronization for specific duration, for example, for 0.2 second, before performing next information synchronization.

Figure 8:
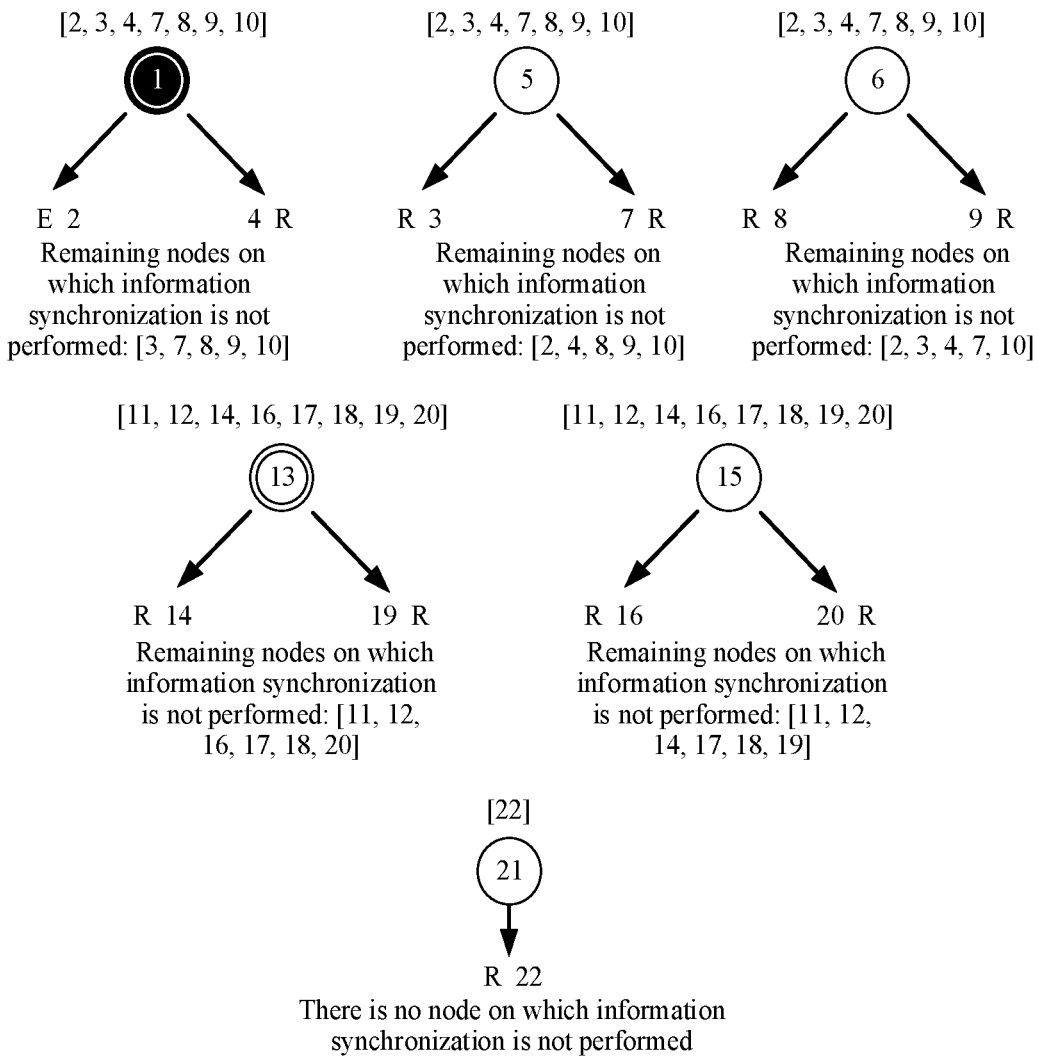
FIG. 8 is a schematic diagram of third-round synchronization during information synchronization according to this application.
Figure 10:
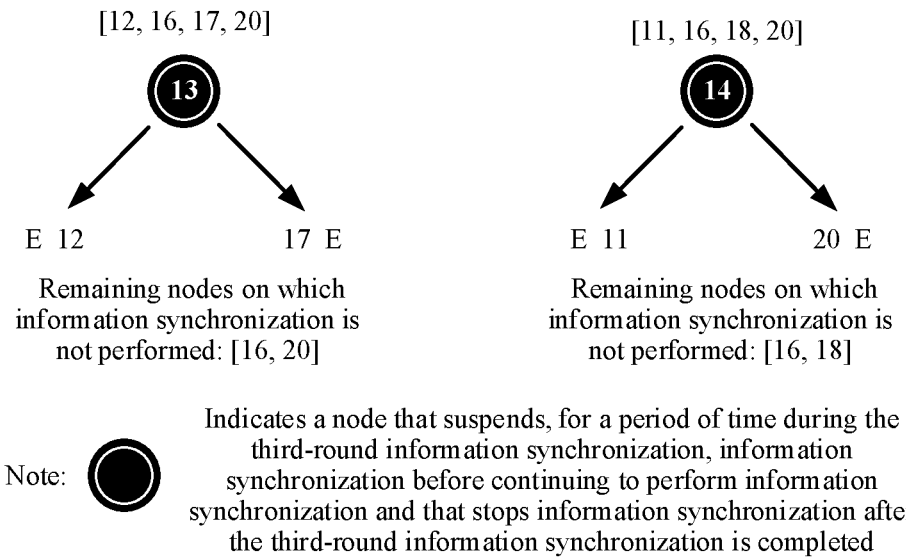
FIG. 10 is a schematic diagram of fifth-round synchronization during information synchronization according to this application.

As shown in FIG. 8, during third-round information synchronization, first nodes in the first group are the node 1, the node 5, and the node 6. The node 1 is currently in a state of suspending information synchronization, and the node 5 and the node 6 continue to perform information synchronization. It is assumed that nodes that are randomly selected by the node 5 from the first group and on which content update is not performed are a node 3 and a node 7. Based on FIG. 8, it can be learned that response messages returned by the node 3 and the node 7 to the node 5 are both R. This indicates that the current information synchronization is successful, and the first node 5 still has the capability of performing information synchronization. After the first node 5 successfully completes information synchronization for the node 3 and the node 7, the node 3 and the node 7 also become first nodes, and nodes included in second node information lists corresponding to the node 5, the node 3, and the node 7 are [1, 5, 6, 3, 7]. Based on the first node information list, it can be learned that nodes that correspond to the node 5, the node 3, and the node 7 and on which information synchronization is not performed are [2, 4, 8, 9, 10]. In this case, the node 5 has performed information synchronization twice consecutively, that is, the first threshold 2 is reached. Therefore, the node 5 needs to suspend information synchronization for specific duration before performing next information synchronization.

Nodes that are randomly selected by the node 6 from the first group and on which content update is not performed are a node 8 and a node 9. Based on FIG. 8, it can be learned that response messages returned by the node 8 and the node 9 to the node 6 are both R. This indicates that the current information synchronization is successful, and the first node 6 still has the capability of performing information synchronization. After the first node 6 successfully completes information synchronization for the node 8 and the node 9, the node 8 and the node 9 also become first nodes, and nodes included in second node information lists corresponding to the node 6, the node 8, and the node 9 are [1, 5, 6, 8, 9]. Based on the first node information list, it can be learned that nodes that correspond to the node 6, the node 8, and the node 9 and on which information synchronization is not performed are [2, 3, 4, 7, 10]. In this case, the node 6 has performed information synchronization twice consecutively, that is, the first threshold 2 is reached. Therefore, the node 6 needs to suspend information synchronization for specific duration before performing next information synchronization. The specific suspension duration may be 0.2 second, or certainly, may be another value.

The first node 1 continues to perform information synchronization after suspending information synchronization for 0.2 second. It is assumed that nodes that are randomly selected by the node 1 from the first group and on which content update is not performed are the node 2 and a node 4. Based on FIG. 8, it can be learned that a response message returned by the node 2 to the node 1 is E and a response message returned by the node 4 to the node 1 is R. This indicates that the current information synchronization fails. After successfully performing information synchronization on the node 4, the first node 1 stops information synchronization. In this case, the node 4 also becomes a first node, and nodes included in a second node information list corresponding to the node 4 are [1, 2, 4, 5, 6]. Based on the first node information list, it can be learned that nodes that correspond to the node 4 and on which information synchronization is not performed are [3, 7, 8, 9, 10].

It should be noted that, because all the nodes in the second group have been re-divided into the third group and the fourth group, the second group does not need to be considered during subsequent information synchronization.

Currently, first nodes in the third group are the node 13 and the node 15. The node 13 is currently in the state of suspending information synchronization. Therefore, the node 15 continues to perform information synchronization. It is assumed that nodes that are randomly selected by the node 15 from the third group and on which content update is not performed are a node 16 and the node 20. Based on FIG. 8, it can be learned that response messages returned by the node 16 and the node 20 to the node 15 are both R. This indicates that the current information synchronization is successful, and the first node 15 still has the capability of performing information synchronization. After the first node 15 successfully completes information synchronization for the node 16 and the node 20, the node 16 and the node 20 also become first nodes, and nodes included in second node information lists corresponding to the node 15, the node 16, and the node 20 are [13, 15, 16, 20]. Based on the first node information list, it can be learned that nodes that correspond to the node 15, the node 16, and the node 20 and on which information synchronization is not performed are [11, 12, 14, 17, 18, 19]. In this case, the node 15 has performed information synchronization twice consecutively, that is, the first threshold 2 is reached. Therefore, the node 15 needs to suspend information synchronization for specific duration before performing next information synchronization.

The first node 13 may continue to perform information synchronization after suspending information synchronization for 0.2 second. It is assumed that nodes that are randomly selected by the node 13 from the third group and on which content update is not performed are a node 14 and a node 19. Based on FIG. 8, it can be learned that response messages returned by the node 14 and the node 19 to the node 13 are both R. This indicates that the current information synchronization is successful, and the first node 13 still has the capability of performing information synchronization. After the first node 13 successfully completes information synchronization for the node 14 and the node 19, the node 14 and the node 19 also become first nodes, and nodes included in second node information lists corresponding to the node 13, the node 14, and the node 19 are [13, 14, 15, 19]. Based on the first node information list, it can be learned that nodes that correspond to the node 13, the node 14, and the node 19 and on which information synchronization is not performed are [11, 12, 16, 17, 18, 20].

Currently, the fourth group includes only one first node, that is, the first node 21, and there is only one corresponding node on which content update is not performed, that is, the node 22. Therefore, the node 21 selects the node 22 for information synchronization. Based on FIG. 8, it can be learned that a response message returned by the node 22 to the node 21 is R. This indicates that the current information synchronization is successful, and the first node 21 still has the capability of performing information synchronization. After the first node 21 successfully completes information synchronization for the node 22, the node 22 also becomes a first node, and nodes included in second node information lists corresponding to the node 21 and the node 22 are [21, 22]. Based on the first node information list, it can be learned that there is no node that corresponds to the node 21 and the node 22 and on which information synchronization is not performed. Therefore, information synchronization is completed for the fourth group, and information synchronization is stopped.

During fourth-round information synchronization, first nodes still having the capability of performing information synchronization in the first group are the node 3 to the node 9, where the node 5 and the node 6 are currently in the state of suspending information synchronization. Therefore, the node 3, the node 4, and the node 7 to the node 9 continue to perform information synchronization. It is assumed that the node 3 randomly selects the node 8 and the node 10 from the corresponding nodes [2, 4, 8, 9, 10] on which content update is not performed. Based on FIG. 9A and FIG. 9B, it can be learned that a response message returned by the node 10 to the node 3 is R and a response message returned by the node 8 to the node 3 is E. This indicates that the current information synchronization fails, and the first node 3 stops information synchronization. After the first node 3 successfully completes information synchronization for the node 10, the node 10 also becomes a first node, and nodes included in a second node information list corresponding to the node 10 are [1, 5, 6, 3, 7, 8, 10]. Based on the first node information list, it can be learned that nodes that correspond to the node 10 and on which information synchronization is not performed are [2, 4, 9].

Likewise, as shown in FIG. 9A and FIG. 9B, although the first node 4 to the first node 9 in the first group still have corresponding nodes on which content update is not performed, information synchronization is actually completed for all the nodes on which content update is not performed. Therefore, regardless of which nodes are selected, in a fourth-round information synchronization process, by the first node 4 to the first node 9 for information synchronization, received response messages sent by the corresponding nodes are all E, and information synchronization is stopped.

First nodes still having the capability of performing information synchronization in the third group are the node 13 to the node 16, the node 19, and the node 20, where the node 15 is currently in the state of suspending information synchronization. Therefore, the node 13, the node 14, the node 16, the node 19, and the node 20 continue to perform information synchronization. It is assumed that the node 13 randomly selects the node 11 and a node 18 from the corresponding nodes [11, 12, 16, 17, 18, 20] on which content update is not performed. Based on FIG. 9A and FIG. 9B, it can be learned that response messages returned by the node 11 and the node 18 to the node 13 are both R. This indicates that the current information synchronization is successful, and the first node 13 may continue to perform information synchronization. After the first node 13 successfully completes information synchronization for the node 11 and the node 18, the node 11 and the node 18 also become first nodes, and nodes included in second node information lists corresponding to the node 13, the node 11, and the node 18 are [11, 13, 14, 15, 18, 19]. Based on the first node information list, it can be learned that nodes that correspond to the node 13, the node 11, and the node 18 and on which information synchronization is not performed are [12, 16, 17, 20].

The node 14 randomly selects a node 12 and a node 17 from the corresponding nodes [11, 12, 16, 17, 18, 20] on which content update is not performed. Based on FIG. 9A and FIG. 9B, it can be learned that response messages returned by the node 12 and the node 17 to the node 14 are both R. This indicates that the current information synchronization is successful, and the first node 14 may continue to perform information synchronization. After the first node 14 successfully completes information synchronization for the node 12 and the node 17, the node 12 and the node 17 also become first nodes, and nodes included in second node information lists corresponding to the node 14, the node 12, and the node 17 are [12, 13, 14, 15, 17, 19]. Based on the first node information list, it can be learned that nodes that correspond to the node 14, the node 12, and the node 17 and on which information synchronization is not performed are [11, 16, 18, 20].

Likewise, although the first node 16, the node 19, and the node 20 in the third group still have corresponding nodes on which content update is not performed, information synchronization is actually completed for all the nodes on which content update is not performed. Therefore, regardless of which nodes are selected, in the fourth-round information synchronization process, by the first node 16, the node 19, and the node 20 for information synchronization, received response messages sent by the corresponding nodes are all E, and information synchronization is stopped.

During fifth-round information synchronization, no first node having the capability of performing information synchronization exists in the first group. Therefore, information synchronization is completed for the first group, and information synchronization is stopped. In the third group, only the node 13 and the node 14 still have the capability of performing information synchronization. It is assumed that the node 13 randomly selects the node 12 and the node 17 from the corresponding nodes [12, 16, 17, 20] on which content update is not performed. Based on FIG. 10, it can be learned that response messages returned by the node 12 and the node 17 to the node 13 are E. This indicates that the current information synchronization fails, and the first node 13 stops information synchronization. The node 14 randomly selects the node 11 and the node 20 from the corresponding nodes [11, 16, 18, 20] on which content update is not performed. Based on FIG. 9A and FIG. 9B, it can be learned that response messages returned by the node 11 and the node 20 to the node 14 are E. This indicates that the current information synchronization fails, and the first node 14 stops information synchronization.

In this case, in the entire distributed network system, no first node having the capability of performing information synchronization exists in the first group and the third group, and no node on which content update is not performed exists in the fourth group. Therefore, information synchronization is stopped in the entire distributed network system.

Based on the foregoing descriptions of the solutions in this application, it may be understood that, to implement the foregoing functions, the foregoing devices include corresponding hardware structures and/or software modules for performing the functions. A person skilled in the art should easily be aware that, in combination with the examples described in the embodiments disclosed in this specification, units and algorithms steps may be implemented using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 11:
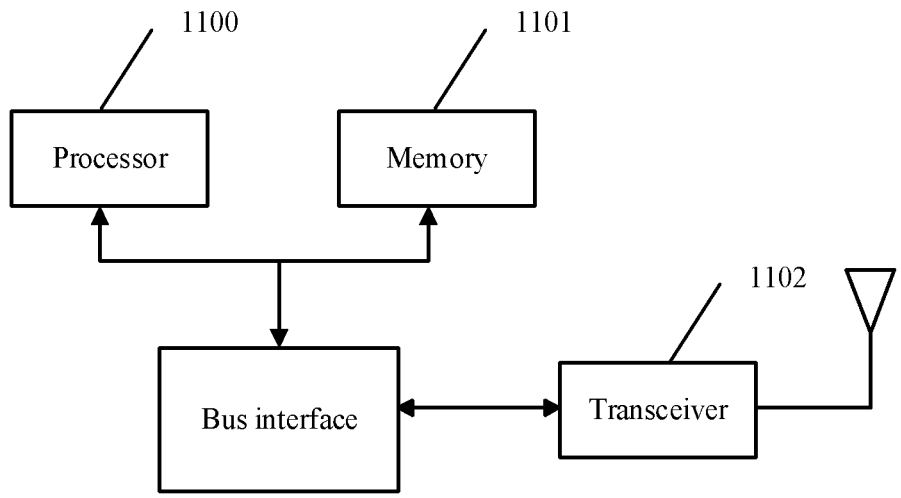
FIG. 11 is a schematic diagram of a first information synchronization apparatus according to this application.

FIG. 11 shows an information synchronization apparatus according to this application. The apparatus includes a processor 1100, a memory 1101, and a transceiver 1102.

The processor 1100 is responsible for managing a bus architecture and routine processing. The memory 1101 may store data used when the processor 1100 performs an operation. The transceiver 1102 is configured to receive and send data under control of the processor 1100.

The bus architecture may include any quantity of interconnected buses and bridges, and connects together various circuits of one or more processors represented by the processor 1100 and a memory represented by the memory 1101. The bus architecture may further connect together various other circuits such as a peripheral device, a voltage stabilizer, and a power management circuit. These are well known in the art, and therefore are not further described in this specification. A bus interface provides an interface. The processor 1100 is responsible for managing the bus architecture and the routine processing. The memory 1101 may store the data used when the processor 1100 performs the operation.

A process disclosed in this embodiment of the present disclosure may be applied to the processor 1100, or implemented by the processor 1100. In an implementation process, steps of a signal processing procedure may be completed using a hardware integrated logic circuit in the processor 1100 or an instruction in a form of software. The processor 1100 may be a general-purpose processor, a digital signal processor, an application-specific integrated circuit (ASIC), a field-programmable gate array (FPGA) or another programmable logic device, a discrete gate or transistor logic device, or a discrete hardware component, and may implement or execute the methods, steps, and logical block diagrams disclosed in the embodiments of the present disclosure. The general-purpose processor may be a microprocessor, any conventional processor, or the like. The steps of the methods disclosed with reference to the embodiments of the present disclosure may be directly performed by a hardware processor, or may be performed using a combination of hardware and software modules in the processor. A software module may be located in a mature storage medium in the art, such as a random-access memory (RAM), a flash memory, a read-only memory (ROM), a programmable ROM (PROM), an electrically erasable PROM (EEPROM), or a register. The storage medium is located in the memory 1101. The processor 1100 reads information in the memory 1101, and completes the steps of the signal processing procedure in combination with hardware of the processor 1100.

The processor 1100 is configured to read a program in the memory 1101 and execute the program to perform the following operations: determining, based on a first node information list and a second node information list, a node on which information synchronization is not performed and that is in a node group to which the processor 1100 belongs, where the first node information list includes node information of all nodes in the node group, and the second node information list includes node information of a node that is in the node group and on which information synchronization has been performed, and selecting at least one second node from the node on which information synchronization is not performed, performing information synchronization on the at least one second node, and updating by adding node information respectively corresponding to the at least one second node to the second node information list.

In a possible implementation method, the processor 1100 is configured to determine a node corresponding to node information that is included in the first node information list but is not included in the second node information list as the node on which information synchronization is not performed.

In a possible implementation method, the node group includes all nodes in a network system, or the node group is a node group obtained after all nodes in a network system are grouped.

In a possible implementation method, a variance between a quantity of nodes included in each node group and an average node quantity is a minimum value, and the average node quantity is a quotient obtained by dividing a quantity of all the nodes in the network system by a preset quantity of node groups that need to be obtained through grouping.

In a possible implementation method, if N node groups are obtained after all the nodes in the network system are grouped, quantities of nodes in the $1^{st}$ to the $(N-1)^{th}$ node groups are equal, and a quantity of nodes in the $N^{th}$ node group is less than or equal to a quantity of nodes included in any one of the $1^{st}$ to the $(N-1)^{th}$ node groups.

In a possible implementation method, the processor 1100 is further configured to stop information synchronization when the second node information list includes all node information included in the first node information list, or stop information synchronization when receiving a response that indicates an information synchronization failure and that is fed back by any one second node.

In a possible implementation method, the processor 1100 is further configured to, if selecting at least one second node from the node on which information synchronization is not performed is used as one round of selection operation, suspend an information synchronization operation when a quantity of rounds of continuously performing the selection operation reaches a first threshold, and resume the information synchronization operation after preset suspension duration.

The preset duration is determined based on an accumulated quantity of rounds of performing the selection operation by the processor 1100.

Figure 12:
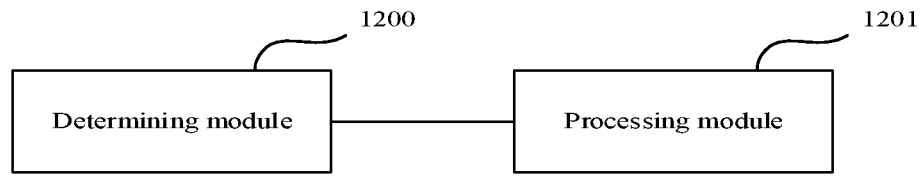
FIG. 12 is a schematic diagram of a second information synchronization apparatus according to this application.

FIG. 12 shows an information synchronization apparatus according to the present disclosure. The apparatus includes a determining module 1200 configured to determine, based on a first node information list and a second node information list, a node on which information synchronization is not performed and that is in a node group to which the determining module 1200 belongs, where the first node information list includes node information of all nodes in the node group, and the second node information list includes node information of a node that is in the node group and on which information synchronization has been performed, and a processing module 1201 configured to select at least one second node from the node on which information synchronization is not performed, perform information synchronization on the at least one second node, and update by adding node information respectively corresponding to the at least one second node to the second node information list.

In a possible implementation method, the determining module 1200 is configured to determine a node corresponding to node information that is included in the first node information list but is not included in the second node information list as the node on which information synchronization is not performed.

In a possible implementation method, the node group includes all nodes in a network system, or the node group is a node group obtained after all nodes in a network system are grouped.

In a possible implementation method, a variance between a quantity of nodes included in each node group and an average node quantity is a minimum value, and the average node quantity is a quotient obtained by dividing a quantity of all the nodes in the network system by a preset quantity of node groups that need to be obtained through grouping.

In a possible implementation method, if N node groups are obtained after all the nodes in the network system are grouped, quantities of nodes in the $1^{st}$ to the $(N-1)^{th}$ node groups are equal, and a quantity of nodes in the $N^{th}$ node group is less than or equal to a quantity of nodes included in any one of the $1^{st}$ to the $(N-1)^{th}$ node groups.

In a possible implementation method, the processing module 1201 is further configured to stop information synchronization when determining that the second node information list includes all node information included in the first node information list, or stop information synchronization when receiving a response that indicates an information synchronization failure and that is fed back by any one second node.

In a possible implementation method, the processing module 1201 is further configured to if the selecting at least one second node from the node on which information synchronization is not performed is used as one round of selection operation, suspend an information synchronization operation when a quantity of rounds of continuously performing the selection operation reaches a first threshold, and resume the information synchronization operation after preset suspension duration.

The preset duration is determined based on an accumulated quantity of rounds of performing the selection operation by the processing module 1201.

Figure 13:
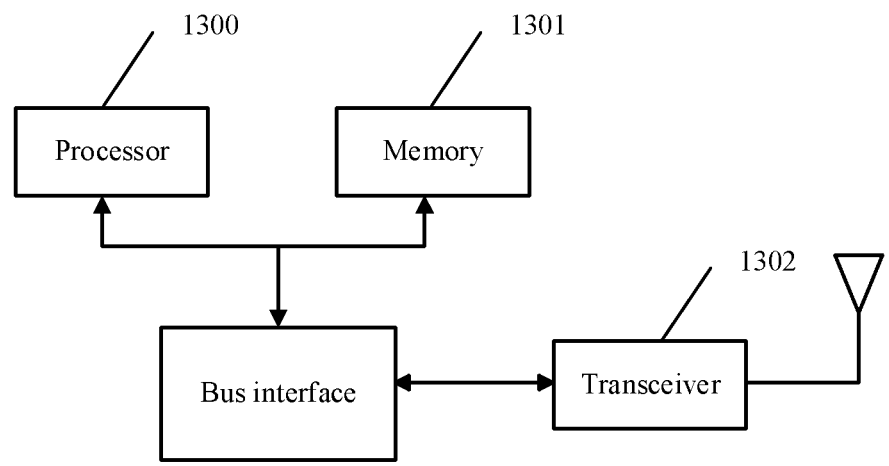
FIG. 13 is a schematic diagram of a third information synchronization apparatus according to this application.

FIG. 13 shows an information synchronization apparatus according to an embodiment of the present disclosure. The apparatus includes a processor 1300, a memory 1301, and a transceiver 1302.

The processor 1300 is responsible for managing a bus architecture and routine processing. The memory 1301 may store data used when the processor 1300 performs an operation. The transceiver 1302 is configured to receive and send data under control of the processor 1300.

The bus architecture may include any quantity of interconnected buses and bridges, and connects together various circuits of one or more processors represented by the processor 1300 and a memory represented by the memory 1301. The bus architecture may further connect together various other circuits such as a peripheral device, a voltage stabilizer, and a power management circuit. These are well known in the art, and therefore are not further described in this specification. A bus interface provides an interface. The processor 1300 is responsible for managing the bus architecture and the routine processing. The memory 1301 may store the data used when the processor 1300 performs the operation.

A process disclosed in this embodiment of the present disclosure may be applied to the processor 1300, or implemented by the processor 1300. In an implementation process, steps of a signal processing procedure may be completed using a hardware integrated logic circuit in the processor 1300 or an instruction in a form of software. The processor 1300 may be a general-purpose processor, a digital signal processor, an ASIC, an FPGA or another programmable logic device, a discrete gate or transistor logic device, or a discrete hardware component, and may implement or execute the methods, steps, and logical block diagrams disclosed in the embodiments of the present disclosure. The general-purpose processor may be a microprocessor, any conventional processor, or the like. The steps of the methods disclosed with reference to the embodiments of the present disclosure may be directly performed by a hardware processor, or may be performed using a combination of hardware and software modules in the processor. A software module may be located in a mature storage medium in the art, such as a RAM, a flash memory, a ROM, a PROM, an EEPROM, or a register. The storage medium is located in the memory 1301. The processor 1300 reads information in the memory 1301, and completes the steps of the signal processing procedure in combination with hardware of the processor 1300.

The processor 1300 is configured to read a program in the memory 1301 and execute the program to perform the following operations: determining, based on a first node information list and a second node information list that is maintained by the processor 1300, a node on which information synchronization is not performed and that is in a node group to which the processor 1300 belongs, where the first node information list includes node information of all nodes in the node group, and the second node information list includes node information that is learned by the first node and that is of a node on which information synchronization has been performed, and selecting at least one second node from the node on which information synchronization is not performed, performing information synchronization on the at least one second node, and updating by adding node information respectively corresponding to the at least one second node to the second node information list.

The transceiver 1302 is configured to send an updated second node information list to a second node for which information synchronization is successfully completed such that the second node for which information synchronization is successfully completed updates, based on the received second node information list, a second node information list corresponding to the second node for which information synchronization is successfully completed.

In a possible implementation method, the processor 1300 is configured to determine a node corresponding to node information that is included in the first node information list but is not included in the second node information list as the node on which information synchronization is not performed.

In a possible implementation method, the node group includes all nodes in a network system, or the node group is a node group obtained after all nodes in a network system are grouped.

In a possible implementation method, a variance between a quantity of nodes included in each node group and an average node quantity is a minimum value, and the average node quantity is a quotient obtained by dividing a quantity of all the nodes in the network system by a preset quantity of node groups that need to be obtained through grouping.

In a possible implementation method, if N node groups are obtained after all the nodes in the network system are grouped, quantities of nodes in the $1^{st}$ to the $(N-1)^{th}$ node groups are equal, and a quantity of nodes in the $N^{th}$ node group is less than or equal to a quantity of nodes included in any one of the $1^{st}$ to the $(N-1)^{th}$ node groups.

In a possible implementation method, the processor 1300 is further configured to stop information synchronization when determining that the second node information list includes all node information included in the first node information list, or stop information synchronization when receiving a response that indicates an information synchronization failure and that is fed back by any one second node.

In a possible implementation method, the processor 1300 is further configured to if the selecting at least one second node from the node on which information synchronization is not performed is used as one round of selection operation, suspend an information synchronization operation when a quantity of rounds of continuously performing the selection operation reaches a first threshold, and resume the information synchronization operation after preset suspension duration.

The preset duration is determined based on an accumulated quantity of rounds of performing the selection operation by the processor 1300.

Figure 14:
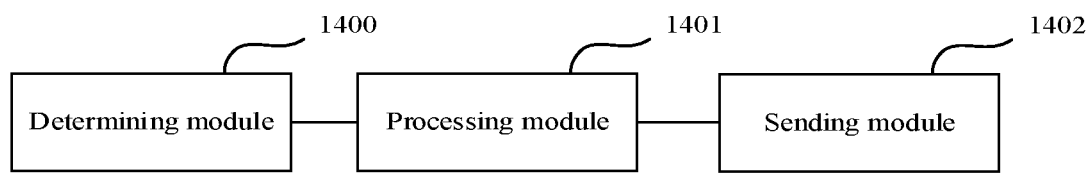
FIG. 14 is a schematic diagram of a fourth information synchronization apparatus according to this application.

FIG. 14 shows an information synchronization apparatus according to the present disclosure. The apparatus includes a determining module 1400 configured to determine, based on a first node information list and a second node information list that is maintained by the determining module 1400, a node on which information synchronization is not performed and that is in a node group to which the determining module 1400 belongs, where the first node information list includes node information of all nodes in the node group, and the second node information list includes node information that is learned by the first node and that is of a node on which information synchronization has been performed, a processing module 1401 configured to select at least one second node from the node on which information synchronization is not performed, perform information synchronization on the at least one second node, and update by adding node information respectively corresponding to the at least one second node to the second node information list, and a sending module 1402 configured to send an updated second node information list to a second node for which information synchronization is successfully completed such that the second node for which information synchronization is successfully completed updates, based on the received second node information list, a second node information list corresponding to the second node for which information synchronization is successfully completed.

In a possible implementation method, the determining module 1400 is configured to determine a node corresponding to node information that is included in the first node information list but is not included in the second node information list as the node on which information synchronization is not performed.

In a possible implementation method, the node group includes all nodes in a network system, or the node group is a node group obtained after all nodes in a network system are grouped.

In a possible implementation method, a variance between a quantity of nodes included in each node group and an average node quantity is a minimum value, and the average node quantity is a quotient obtained by dividing a quantity of all the nodes in the network system by a preset quantity of node groups that need to be obtained through grouping.

In a possible implementation method, if N node groups are obtained after all the nodes in the network system are grouped, quantities of nodes in the $1^{st}$ to the $(N-1)^{th}$ node groups are equal, and a quantity of nodes in the $N^{th}$ node group is less than or equal to a quantity of nodes included in any one of the $1^{st}$ to the $(N-1)^{th}$ node groups.

In a possible implementation method, the processing module 1401 is further configured to stop information synchronization when determining that the second node information list includes all node information included in the first node information list, or stop information synchronization when receiving a response that indicates an information synchronization failure and that is fed back by any one second node.

In a possible implementation method, the processing module 1401 is further configured to if the selecting at least one second node from the node on which information synchronization is not performed is used as one round of selection operation, suspend an information synchronization operation when a quantity of rounds of continuously performing the selection operation reaches a first threshold, and resume the information synchronization operation after preset suspension duration.

The preset duration is determined based on an accumulated quantity of rounds of performing the selection operation by the processing module 1401.

In some possible implementations, the aspects of the information synchronization method provided in the embodiments of the present disclosure may alternatively be implemented as a program product, and the program product includes program code. When the program code is run on a computer device, the program code is used to enable the computer device to perform the steps in the information synchronization method in various example implementations of the present disclosure in this specification.

The program product may use any combination of one or more readable media. The readable medium may be a readable signal medium or a readable storage medium. For example, the readable storage medium may be, but is not limited to, an electrical, magnetic, optical, electromagnetic, infrared, or semiconductor system, apparatus or device, or any combination thereof. More specific examples (non-exhaustive list) of the readable storage medium include an electrical connection having one or more conducting wires, a portable disk, a hard disk, a RAM, a ROM, an EPROM or flash memory, an optical fiber, a portable compact disc (CD) ROM (CD-ROM), an optical storage device, a magnetic storage device, or any appropriate combination thereof.

A program product for information synchronization in an implementation of the present disclosure may use a portable CD-ROM and include program code, and may run on a server device. However, the program product in the present disclosure is not limited thereto. In this specification, the readable storage medium may be any tangible medium that includes or stores a program. The program may be used by an information transmission apparatus or device, or may be used in combination with an information transmission apparatus or device.

The readable signal medium may include a data signal propagated in a baseband or as a part of a carrier, where the data signal carries readable program code. The propagated data signal may be in a plurality of forms, including but not limited to an electromagnetic signal, an optical signal, or any appropriate combination thereof. The readable signal medium may alternatively be any readable medium other than the readable storage medium. The readable medium may send, propagate, or transmit a program used by or in combination with a periodic network action system, apparatus, or device.

The program code included in the readable medium may be transmitted using any appropriate medium, including but not limited to a wireless medium, a wired medium, an optical cable, a radio frequency (RF) medium, or any appropriate combination thereof.

The program code used to execute the operations of the present disclosure may be written in any combination of one or more program design languages. The program design languages include object-oriented program design languages such as Java and C++, and further include a conventional procedural program design language such as the "C" language or a similar program design language. The program code may be completely executed on a user's computing device, partially executed on user equipment, executed as an independent software package, partially executed on a user's computing device and partially executed on a remote computing device, or completely executed on a remote computing device or server. When the program code is executed on the remote computing device, the remote computing device may be connected to the user's computing device using any type of network, including a local area network (LAN) or a wide area network (WAN), or may be connected to an external computing device.

An embodiment of this application further provides a computing device readable storage medium for the information synchronization method. Based on the storage medium, content is not lost after a power failure. The storage medium stores a software program including program code. When the program code is run on a computing device, when the software program is read and executed by one or more processors, any information synchronization solution in the foregoing embodiments of this application can be implemented.

The foregoing describes this application with reference to the block diagrams and/or flowcharts of the method, the apparatus (system), and/or the computer program product in the embodiments of this application. It should be understood that a block in the block diagrams and/or flowcharts and a combination of blocks in the block diagrams and/or flowcharts can be implemented using computer program instructions. These computer program instructions may be provided to a processor of a general-purpose computer, a processor of a special-purpose computer, and/or another programmable data processing apparatus to produce a machine such that the instructions executed by the processor of the computer and/or the other programmable data processing apparatus create a method for implementing a specific function/action in a block in the block diagrams and/or flowcharts.

Correspondingly, this application may alternatively be implemented using hardware and/or software (including firmware, resident software, microcode, and the like). Still further, this application may be in a form of a computer program product on a computer-usable or computer-readable storage medium. The computer program product has computer-usable or computer-readable program code implemented in the medium, for use by an instruction execution system or in combination with an instruction execution system. In the context of this application, the computer-usable or computer-readable medium may be any medium, and may include, store, transmit, or transfer a program, for use by an instruction execution system, apparatus, or device or in combination with an instruction execution system, apparatus, or device.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and are intended to cover any of or all modifications, variations, combinations or equivalents within the scope of this application. Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An information synchronization method, implemented by a first node, comprising:
   determining, based on a first node information list and a second node information list, a second node on which an information synchronization has not been performed and that is in a node group to which the first node belongs, wherein the first node information list comprises first node information of third nodes in the node group, and wherein the second node information list comprises second node information of a fourth node in the node group and on which the information synchronization has been performed;
   selecting the second node;

performing the information synchronization on the second node; and updating, by adding third node information corresponding to the second node, the second node information list.

2. The information synchronization method of claim 1, further comprising determining a fifth node corresponding to fourth node information that is in the first node information list and is not comprised in the second node information list as the second node.

3. The information synchronization method of claim 1, wherein the node group comprises sixth nodes in a network system, or wherein the method further comprises obtaining the node group by grouping the sixth nodes.

4. The information synchronization method of claim 3, wherein a variance between a quantity of nodes comprised in second node groups and an average node quantity is a minimum value, and wherein the average node quantity is a quotient obtained by dividing a quantity of the sixth nodes by a preset quantity of third node groups obtained through grouping.

5. The information synchronization method of claim 3, further comprising obtaining N node groups by grouping the sixth nodes, wherein a first quantity of nodes in a first node group to an $(N-1)^{th}$ node group are equal, and wherein a second quantity of nodes in an $N^{th}$ node group is less than or equal to the first quantity.

6. The information synchronization method of claim 1, further comprising:
stopping the information synchronization when the second node information list comprises the first node information; or
stopping the information synchronization when receiving a response indicating an information synchronization failure from the second node.

7. The information synchronization method of claim 1, further comprising:
suspending an information synchronization operation when a quantity of rounds of continuously performing a selection operation by the first node reaches a first threshold and when selecting the second node is one round of the selection operation; and
resuming the information synchronization operation after a preset suspension duration based on an accumulated quantity of rounds of performing the selection operation.

8. An information synchronization method, implemented by a first node, comprising:
determining, based on a first node information list and a second node information list maintained by the first node, a second node on which an information synchronization is not performed and that is in a node group to which the first node belongs, wherein the first node information list comprises first node information of third nodes in the node group, and wherein the second node information list comprises second node information is learned by the first node and that is of a fourth node on which the information synchronization has been performed;
selecting the second node;
performing the information synchronization on the second node;
adding third node information corresponding to the second node to the second node information list; and
sending an updated second node information list to the second node to enable the second node to update, based on the updated second node information list, a third node information list maintained by the second node.

9. The information synchronization method of claim 8, further comprising determining a fifth node corresponding to first node information that is comprised in the first node information list but is not comprised in the second node information list as the second node.

10. The information synchronization method of claim 8, wherein the node group comprises sixth nodes in a network system, or wherein the method further comprises obtaining the node group by grouping the sixth nodes.

11. The information synchronization method of claim 10, wherein a variance between a quantity of nodes comprised in each of second node groups and an average node quantity is a minimum value, and wherein the average node quantity is a quotient obtained by dividing a quantity of the sixth nodes by a preset quantity of third node groups obtained through grouping.

12. The information synchronization method of claim 10, further comprising obtaining N node groups by grouping the sixth nodes, wherein a first quantity of nodes in a first node group to an $(N-1)^{th}$ node group are equal, and wherein a second quantity of nodes in an $N^{th}$ node group is less than or equal to the first quantity.

13. The information synchronization method of claim 8, further comprising:
stopping the information synchronization when the second node information list comprises the first node information; or
stopping the information synchronization when receiving a response indicating an information synchronization failure from the second node.

14. The information synchronization method of claim 8, further comprising:
suspending an information synchronization operation when a quantity of rounds of continuously performing a selection operation by the first node reaches a first threshold and when selecting the second node is one round of the selection operation; and
resuming the information synchronization operation after a preset suspension duration based on an accumulated quantity of rounds of performing the selection operation.

15. A first node comprising:
a memory configured to store program instructions; and
a processor coupled to the memory, wherein the program instructions cause the processor to be configured to:
determine, based on a first node information list and a second node information list, a second node on which an information synchronization has not been performed and that is in a node group to which the first node belongs, wherein the first node information list comprises first node information of third nodes in the node group, and wherein the second node information list comprises second node information of a fourth node in the node group and on which the information synchronization has been performed;
select the second node;
perform the information synchronization on the second node; and
update by adding third node information corresponding to the second node to the second node information list.

16. The first node of claim 15, wherein the program instructions further cause the processor to be configured to determine a fifth node corresponding to fourth node information that is in the first node information list and is not comprised in the second node information list as the second node.

17. The first node of claim 16, wherein the node group comprises sixth nodes in a network system, or wherein the program instructions further cause the processor to be configured to obtain the node group by grouping the sixth nodes.

18. The first node of claim 17, wherein a variance between a quantity of nodes comprised in second node groups and an average node quantity is a minimum value, and wherein the average node quantity is a quotient obtained by dividing a quantity of the sixth nodes by a preset quantity of third node groups obtained through grouping.

19. The first node of claim 15, wherein the program instructions further cause the processor to be configured to:
- stop the information synchronization when the second node information list comprises the first node information; or
- stop the information synchronization when receiving a response indicating an information synchronization failure from the second node.

20. The first node of claim 15, wherein the program instructions further cause the processor to be configured to:
- suspend an information synchronization operation when a quantity of rounds of continuously performing a selection operation by the first node reaches a first threshold and when selecting the second node is one round of the selection operation; and
- resume the information synchronization operation after a preset suspension duration based on an accumulated quantity of rounds of performing the selection operation.

* * * * *